(12) United States Patent
Kannari et al.

(10) Patent No.: US 12,072,533 B2
(45) Date of Patent: Aug. 27, 2024

(54) OPTICAL TRANSMISSION APPARATUS, OPTICAL MODULATOR, AND ACTIVATION METHOD

(71) Applicant: FUJITSU OPTICAL COMPONENTS LIMITED, Kawasaki (JP)

(72) Inventors: Kenta Kannari, Sapporo (JP); Toshio Ishii, Yokohama (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 281 days.

(21) Appl. No.: 17/592,801

(22) Filed: Feb. 4, 2022

(65) Prior Publication Data

US 2022/0317377 A1 Oct. 6, 2022

(30) Foreign Application Priority Data

Mar. 30, 2021 (JP) ................. 2021-057702

(51) Int. Cl.
  *G02B 6/293* (2006.01)
  *G02B 6/12* (2006.01)
  *G02F 1/21* (2006.01)

(52) U.S. Cl.
  CPC ............ *G02B 6/2935* (2013.01); *G02B 6/12* (2013.01); *G02F 1/212* (2021.01); *G02B 2006/12135* (2013.01); *G02B 2006/12138* (2013.01)

(58) Field of Classification Search
  CPC ............ G02B 6/2935; G02B 6/12; G02B 2006/12135; G02B 2006/12138; G02F 1/212; G02F 1/0121
  See application file for complete search history.

(56) References Cited

U.S. PATENT DOCUMENTS

| 8,666,200 | B2 * | 3/2014 | Takabayashi ......... G02F 1/0123 385/27 |
| 2013/0051725 | A1 | 2/2013 | Shinoda et al. |
| 2019/0109668 | A1 | 4/2019 | Noheji et al. |

FOREIGN PATENT DOCUMENTS

| JP | 2007-329212 | 12/2007 |
| JP | 2013-061632 | 4/2013 |
| JP | 2018-14473 | 1/2018 |
| JP | 2019-071531 | 5/2019 |

OTHER PUBLICATIONS

Japanese Office Action mailed on Jul. 2, 2024 in the corresponding Japanese Patent Application No. 2021-057702.

* cited by examiner

*Primary Examiner* — John Bedtelyon
(74) *Attorney, Agent, or Firm* — STAAS & HALSEY LLP

(57) ABSTRACT

An optical transmission apparatus includes an emitter that emits an optical signal in accordance with a bias current, and a Mach-Zehnder optical modulator that optically modulates the optical signal in accordance with an electrical signal. The optical modulator includes a detector that detects a temperature inside the optical modulator, and a controller that, when detecting activation of a power supply, controls the temperature inside the optical modulator such that the temperature detected by the detector reaches a target temperature.

11 Claims, 15 Drawing Sheets

FIG.7

| BASIC RELATIONAL EXPRESSION | $Tmzm(t) = Tmzm0 + Ta(t) + Tb(t)$ |
|---|---|
| $t < t1$ | $Ta(t) = 0$ <br> $Tb(t) = 0$ |
| $t1 \leq t < t2$ | $Ta(t) = \theta a * PaLimit * (1 - \exp(-t/\tau a))$ <br> $Tb(t) = \theta b * Pb * (1 - \exp(-t/\tau b))$ |
| $t2 \leq t$ | $Ta(t) = Ta(t2) + (1 - Ta(t2)/(\theta a * Pa)) * \theta a * Pa * (1 - \exp(-(t-t2)/\tau a))$ <br> HERE, $Ta(t2) = \theta a * PaLimit * (1 - \exp(-t2/\tau a))$ <br> $Tb(t) = \theta b * Pb * (1 - \exp(-t/\tau b))$ |
| $t = \infty$ | $Ta(t) = \theta a * Pa$ <br> $Tb(t) = \theta b * Pb$ |

Pa: LD STATIONARY POWER CONSUMPTION [W]
Palimit: LD STATIONARY POWER CONSUMPTION UPPER LIMIT [W]
Pb: MZM HEATER STATIONARY POWER CONSUMPTION [W]
Tmzm: MZM TEMPERATURE IN EQUILIBRIUM STATE [°C]
Tmzm0: MZM INITIAL TEMPERATURE [°C]
$\theta a$: THERMAL RESISTANCE BETWEEN LD AND MZM [°C/W]
$\theta b$: THERMAL RESISTANCE BETWEEN MZM AND MZM HEATER [°C/W]

Ta: INCREASING TEMPERATURE GIVEN BY LD TO MZM [°C]
Tb: INCREASING TEMPERATURE GIVEN BY MZM HEATER TO MZM [°C]

$\tau a$: TIME CONSTANT OF THERMAL CONDUCTION FROM LD TO MZM [sec]
$\tau b$: TIME CONSTANT OF THERMAL CONDUCTION FROM MZM HEATER TO MZM [sec]

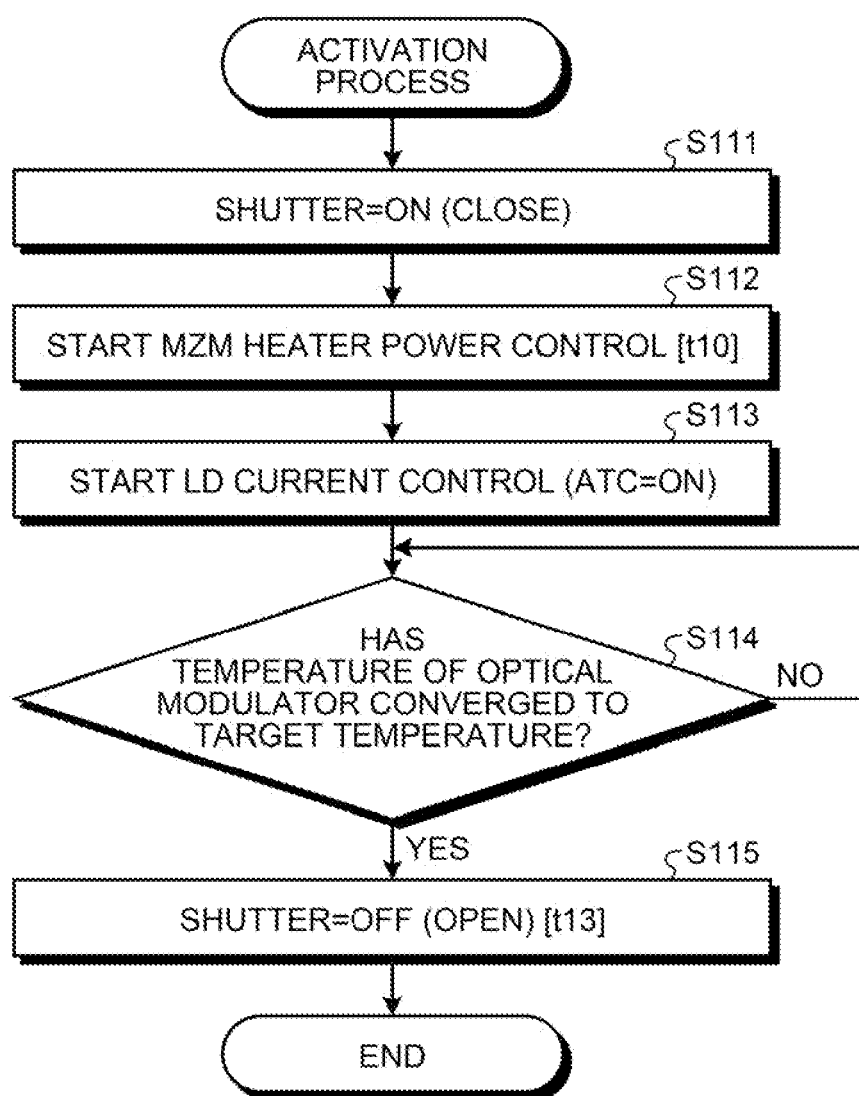

OPTICAL TRANSMISSION APPARATUS, OPTICAL MODULATOR, AND ACTIVATION METHOD

CROSS-REFERENCE TO RELATED APPLICATION

This application is based upon and claims the benefit of priority of the prior Japanese Patent Application No. 2021-057702, filed on Mar. 30, 2021, the entire contents of which are incorporated herein by reference.

FIELD

The embodiments discussed herein are related to an optical transmission apparatus, an optical modulator, and an activation method.

BACKGROUND

In recent years, in optical transmission apparatuses, reduction in apparatus sizes and electric power is promoted at an accelerated rate, and therefore, there is a demand for sophistication and high functionality of specifications. In addition, Mach-Zehnder optical modulators are widely adopted in the optical transmission apparatuses. In this case, for example, a start-up time from start of activation of a power supply to start of operation of an optical transmission apparatus is an important parameter to determine value of the optical transmission apparatus.

[Patent Document 1] Japanese Laid-open Patent Publication No. 2007-329212
[Patent Document 2] Japanese Laid-open Patent Publication No. 2018-14473

However, a Mach-Zehnder optical modulator used in an optical transmission apparatus has high temperature dependence, and the optical transmission apparatus stabilizes temperature of the optical modulator at target temperature; therefore, it takes time to stabilize the temperature of the optical modulator at the target temperature. As a result, in reality, the start-up time of the optical transmission apparatus usually increases.

SUMMARY

According to an aspect of an embodiment, an optical transmission apparatus includes an emitter and a Mach-Zehnder optical modulator. The emitter emits an optical signal in accordance with a bias current. The Mach-Zehnder optical modulator optically modulates the optical signal in accordance with an electrical signal. The optical modulator includes a detector and a controller. The detector detects a temperature inside the optical modulator. The controller controls, when detecting activation of a power supply, the temperature inside the optical modulator such that the temperature detected by the detector reaches a target temperature.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram for explaining an example of a temperature relational expression of a Mach-Zehnder Modulator (MZM) according to the third embodiment;

FIG. 16 is a flowchart illustrating an example of processing operation related to an activation process of the optical transmission apparatus according to the comparative example.

DESCRIPTION OF EMBODIMENTS

Figure 14:
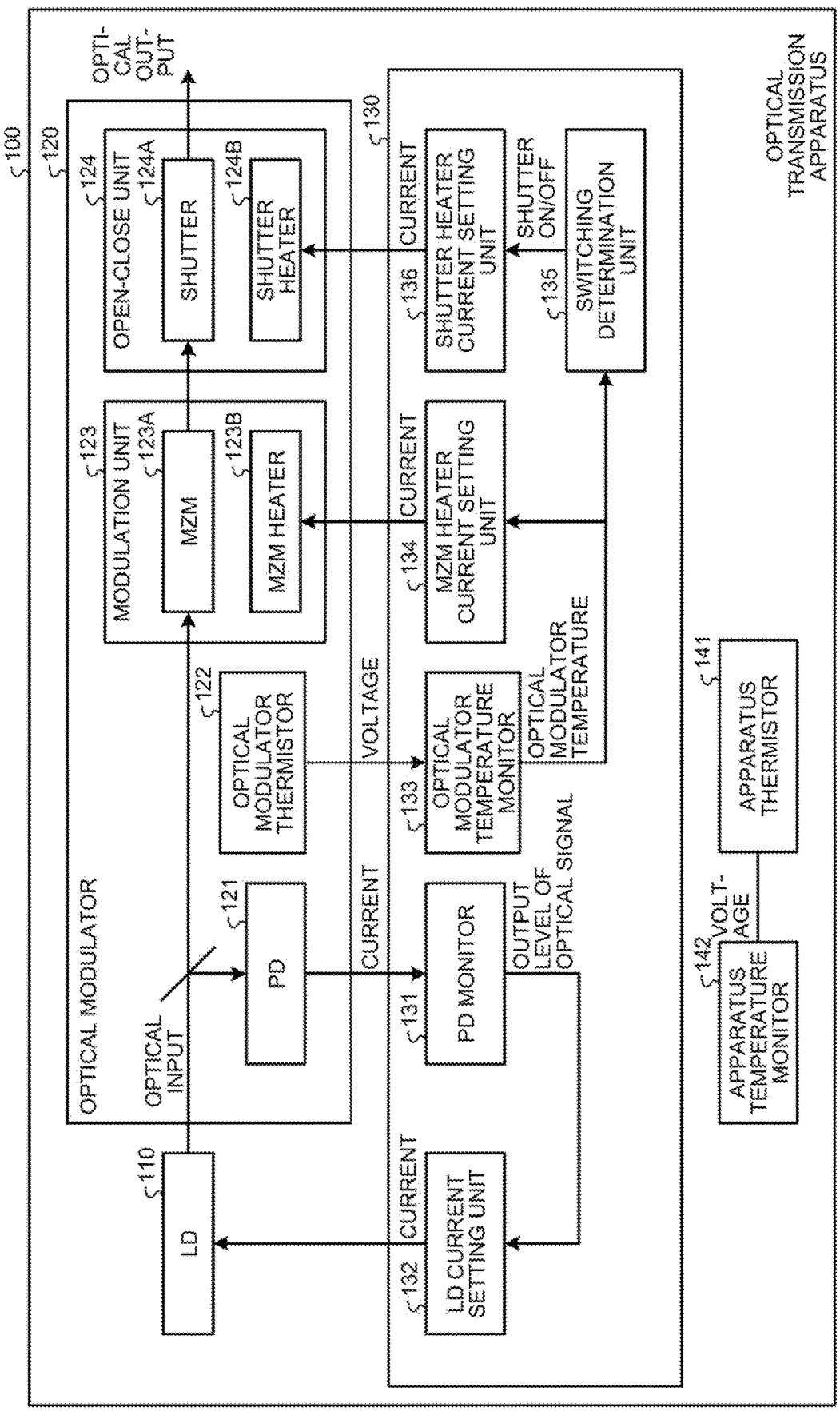
FIG. 14 is a block diagram illustrating an example of an optical transmission apparatus according to a comparative example.

First, an optical transmission apparatus 100 according to a comparative example will be described. FIG. 14 is a block diagram illustrating an example of the optical transmission apparatus 100 according to the comparative example. The optical transmission apparatus 100 according to the comparative example illustrated in FIG. 14 includes a laser diode (LD) 110, an optical modulator 120, a control unit 130, an apparatus thermistor 141, and an apparatus temperature monitor 142. The LD 110 emits continuous wave (CW) light in accordance with a bias current, and changes an output level of an optical signal in accordance with a quantity of the bias current. The optical modulator 120 is a silicon photonics optical modulator with high temperature dependence. The optical modulator 120 includes a photodiode (PD) 121, an optical modulator thermistor 122, a modulation unit 123, and an open-close unit 124. The PD 121 performs current conversion on the optical signal from the LD 110, and detects an output level of the optical signal subjected to the current conversion. The optical modulator thermistor 122 performs voltage conversion on temperature inside the optical modulator 120.

The modulation unit 123 performs optical modulation on the optical signal from the LD 110 in accordance with applied voltage. The modulation unit 123 includes an MZM 123A and an MZM heater 123B. The MZM 123A includes two arms on which signal electrodes are arranged, and if voltage is applied to the signal electrodes, electric fields are generated inside the arms, and optical refraction indices in the arms are changed by the electric fields. As a result, phases of optical signals that propagate through the arms are changed, so that the optical signals are modulated in accordance with a phase difference between the arms. The MZM heater 123B applies heat to each of the arms of the MZM 123A and adjusts a phase amount of the optical signal that propagates through each of the arms. Then, the MZM 123A applies voltage to the optical signal from the LD 110 and outputs an optically modulated signal.

The open-close unit 124 includes a shutter 124A and a shutter heater 124B. The shutter 124A adjusts the phase amount of the optically modulated signal coming from the MZM 123A, and turns on and off output of the optically modulated signal. The shutter heater 124B applies heat to the shutter 124A to adjust the phase amount of the optically modulated signal.

The control unit 130 includes a PD monitor 131, an LD current setting unit 132, an optical modulator temperature monitor 133, an MZM heater current setting unit 134, a switching determination unit 135, and a shutter heater current setting unit 136. The PD monitor 131 detects an output level of the optical signal of the LD 110, which is a PD monitoring result corresponding to a current value that is detected by the PD 121 in the optical modulator 120. The LD current setting unit 132 sets a bias current to be supplied to the LD 110 such that the output level of the optical signal that is the PD monitoring result reaches a stable target level.

The optical modulator temperature monitor 133 detects voltage corresponding to the temperature inside the optical modulator 120 through the optical modulator thermistor 122, and acquires the temperature inside the optical modulator 120 and corresponding to the voltage, as an optical modulator temperature monitoring result.

The MZM heater current setting unit 134 sets a drive current to be supplied to the MZM heater 123B, on the basis of temperature of the optical modulator 120 acquired by the optical modulator temperature monitor 133. The switching determination unit 135 turns on and off the shutter 124A on the basis of the temperature of the optical modulator 120. The shutter heater current setting unit 136 sets a drive current to be supplied to the shutter heater 124B on the basis of a switching determination result of ON and OFF of the shutter 124A.

The apparatus thermistor 141 performs voltage conversion on the temperature inside the optical transmission apparatus 100. The apparatus temperature monitor 142 detects voltage corresponding to the temperature inside the optical transmission apparatus 100 through the apparatus thermistor 141, and acquires the temperature inside the optical transmission apparatus 100 corresponding to the voltage.

Figure 15:
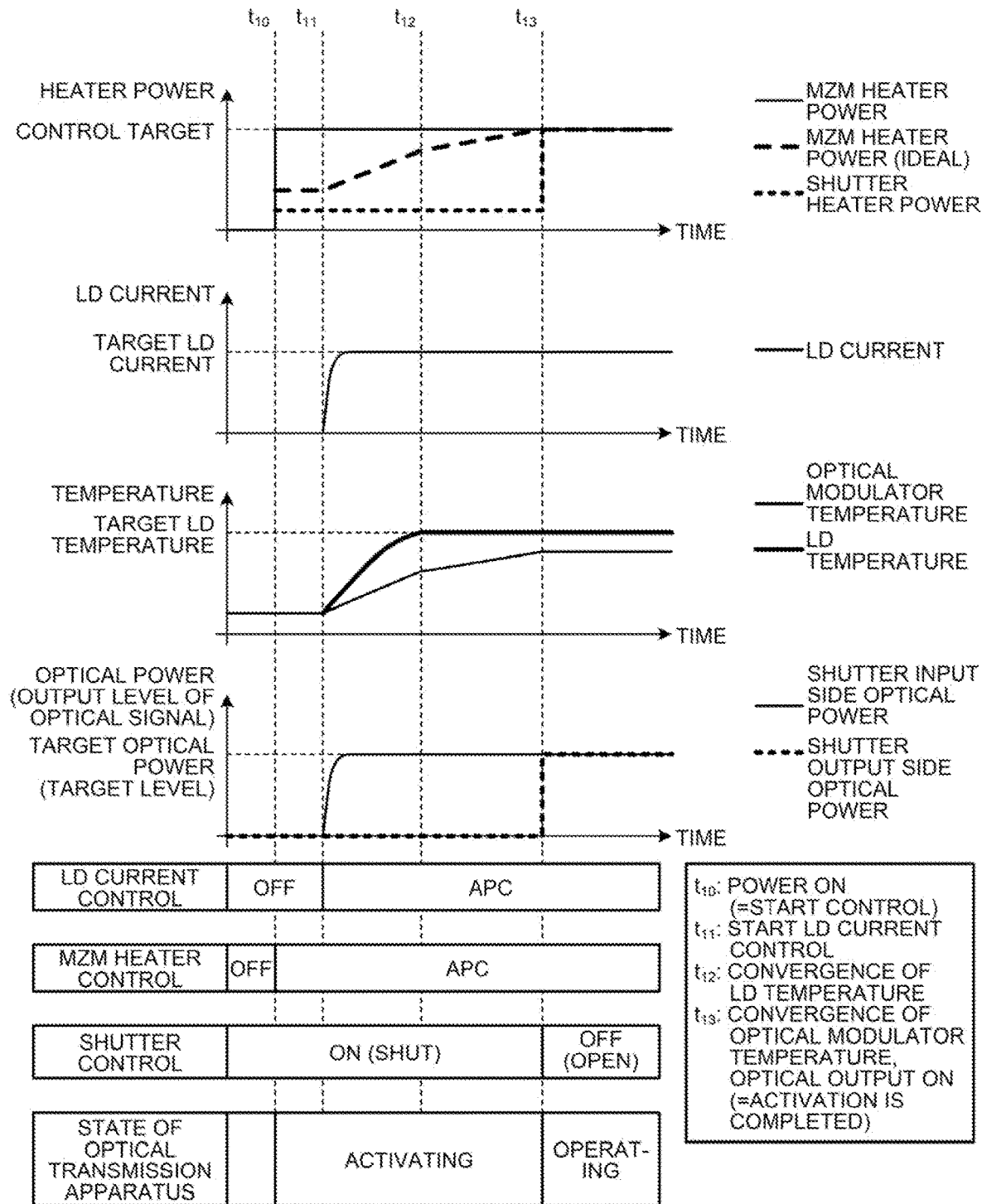
FIG. 15 is a diagram for explaining an example of temporal changes of heater power, an LD current, temperature, and optical output from start of activation of a power supply to start of operation of the optical transmission apparatus according to the comparative example.

FIG. 15 is a diagram for explaining an example of temporal changes of heater power, an LD current, temperature, and optical output from start of activation of a power supply to start of operation of the optical transmission apparatus 100 according to the comparative example. A period from the start of activation of the power supply to the start of the operation is divided by timings t10, t11, t12 and t13. t10 is a timing at which the power supply of the optical transmission apparatus 100 is activated and control is started. t11 is a timing at which control of the bias current to the LD 110 is started. t12 is a timing at which LD temperature of the LD 110 converges to stabilized temperature (first target temperature). t13 is a timing at which the temperature of the optical modulator 120 converges to stabilized temperature (second target temperature) and at which operation of the optical transmission apparatus 100 is started where the output of the optically modulated signal is turned on.

The MZM heater 123B starts power control at the timing t10, and the shutter heater 124B starts power control at the timing t13. As for the LD current, control of the bias current to the LD 110 is started at the timing t11 to cause the LD current to converge to a target LD current.

LD temperature gradually increases with supply of the bias current to the LD 110 from the timing t11, and the LD temperature converges to stabilized temperature (first target temperature, i.e., target LD temperature) at the timing t12. Furthermore, optical modulator temperature gradually increases with an increase in the LD temperature since the start of supply of the bias current to the LD 110 from the timing t11, and the temperature of the optical modulator 120 converges to stabilized temperature (second target temperature) at around the timing t13.

The optical power, i.e., the output level of the optical signal, reaches target optical power (target level) along with the start of LD current control at the timing t11 and the convergence of the LD current to the target LD current. Further, as for the shutter 124A, the shutter 124A is turned off at the timing t13 at which the temperature of the optical modulator 120 converges to the second target temperature, and allows the optically modulated signal with the target optical power to be output.

As the LD current control by the LD current setting unit 132, auto power control (APC) of the LD current control is started in accordance with the timing t11. As MZM heater control by the MZM heater current setting unit 134, APC of the MZM heater control is started in accordance with the timing t10. As shutter control by the switching determination unit 135, an ON state is normally set and an OFF state is set in accordance with the timing t13. Meanwhile, the output of the optically modulated signal of the modulation unit 123 is turned off when the shutter 124A is turned on, and the output of the optically modulated signal of the modulation unit 123 is turned on when the shutter 124A is turned off. Furthermore, as a state of the optical transmission apparatus 100, activation is started at the timing t10, and the activation state is switched to an operating state in accordance with the timing t13.

FIG. 16 is a flowchart illustrating an example of processing operation related to an activation process of the optical transmission apparatus 100 according to the comparative example. The switching determination unit 135 in the optical transmission apparatus 100 changes a state of the shutter 124A to the ON state and stops output of the optically modulated signal from the modulation unit 123 in accordance with activation of the power supply (Step S111). The MZM heater current setting unit 134 in the optical transmission apparatus 100 starts the power control on the MZM heater 123B when the shutter 124A is in the ON state (Step S112). The MZM heater current setting unit 134 starts power control on the MZM heater 123B at the timing t10.

The LD current setting unit 132 in the optical transmission apparatus 100, after the MZM heater power control is started, starts the APC of the LD current control to start the LD current control (Step S113). Meanwhile, the LD current setting unit 132 starts the APC of the LD current control at the timing tn. As a result, in the optical transmission apparatus 100, the LD 110 generates heat in accordance with the bias current supplied to the LD 110, and the temperature inside the optical modulator 120 gradually increases with the heat generated by the LD 110.

The switching determination unit 135 in the optical transmission apparatus 100 determines whether, for example, the temperature inside the optical modulator 120 has converged to the second target temperature (stabilized temperature) (Step S114). Meanwhile, the optical modulator temperature monitor 133 acquires the temperature inside the optical modulator 120. If the temperature inside the optical modulator 120 has converged to the second target temperature (stabilized temperature) (Step S114: Yes), the optical transmission apparatus 100 turns off the shutter 124A and starts to output the optically modulated signal from the modulation unit 123 (Step S115). Then, the processing operation illustrated in FIG. 16 is terminated. Further, if the temperature inside the optical modulator 120 has not converged to the second target temperature (stabilized temperature) (Step S114: No), the optical transmission apparatus 100 returns to Step S114 to determine whether the temperature inside the optical modulator 120 has converged to the second target temperature.

For example, even if the LD temperature is stabilized at the first target temperature, it takes time until the temperature of the optical modulator 120 is stabilized at the second target temperature. Further, a temperature optimal point of the MZM heater 123B has temperature dependence, and optimal heater power varies in accordance with the temperature of the optical modulator 120. A time constant of a disturbance that imposes a thermal influence on the optical modulator 120 is long. The thermal influence due to the disturbance includes a thermal influence from the LD 110 that is located outside the optical modulator 120, a heat dissipation part (not illustrated), and other heaters (the MZM 123A, the shutter 124A) in the optical modulator 120. As the time constant, a thermal time constant of the heater itself is in the order of microseconds, which is too fast to be a problem, whereas a time constant of the thermal influence from the disturbance is in the order of seconds, which is slow. It takes time until temperature is stabilized due to the thermal influence of the disturbance. As a result, it takes time until the temperature of the optical modulator 120 is stabilized at the second target temperature, and a start-up time from activation of the power supply to start of operation of the optical transmission apparatus 100 increases.

The optical transmission apparatus 100 according to the comparative example supplies the bias current to the LD 110 to gradually increase the temperature of the optical modulator 120 such that the temperature converges to the second target temperature (stabilized temperature). However, in the optical transmission apparatus 100, it takes time until the temperature inside the optical modulator 120 converges to the stabilized temperature and there is a need to reduce the start-up time from activation of the power supply to start of the operation. Therefore, an embodiment of an optical transmission apparatus 1 that is able to prevent the situation as described above will be described below as a first embodiment. Meanwhile, the disclosed technology is not limited by each of embodiments described below. Further, the embodiments described below may be appropriately combined as long as no contradiction is derived.

[a] First Embodiment

Figure 1:
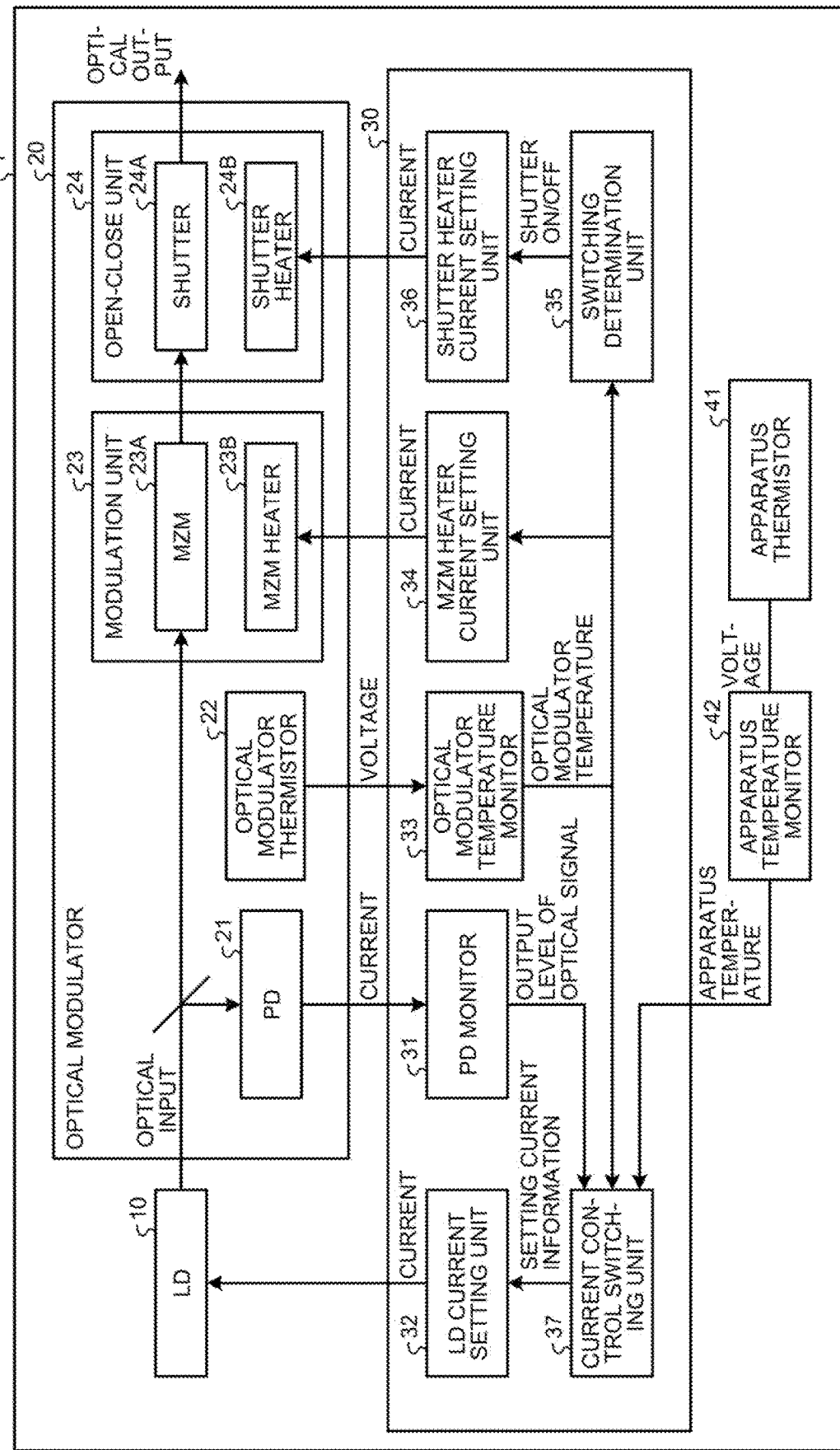
FIG. 1 is a block diagram illustrating an example of optical transmission apparatuses according to first to fourth embodiments.

FIG. 1 is a block diagram illustrating an example of the optical transmission apparatus 1 according to the first embodiment to a fourth embodiment. The optical transmission apparatus 1 illustrated in FIG. 1 includes an LD 10, an optical modulator 20, a control unit 30, an apparatus thermistor 41, and an apparatus temperature monitor 42. The LD 10 emits continuous wave (CV) light in accordance with a bias current, and changes an output level of an optical signal in accordance with a quantity of the bias current. The optical modulator 20 is, for example, a silicon photonics optical modulator. The optical modulator 20 includes a PD 21, an optical modulator thermistor 22, a modulation unit 23, and an open-close unit 24. The PD 21 performs current conversion on the optical signal from the LD 10, and detects an output level of the optical signal subjected to the current conversion. The optical modulator thermistor 22 performs voltage conversion on temperature inside the optical modulator 20.

The modulation unit 23 performs optical modulation on the optical signal from the LD 10 in accordance with applied voltage. The modulation unit 23 includes an MZM 23A and an MZM heater 23B. The MZM 23A includes two arms through which the optical signal from the LD 10 propagates, and signal electrodes are arranged on the respective arms. If voltage is applied to the signal electrodes of the MZM 23A, electric fields are generated inside the arms, and optical refraction indices in the arms are changed by the electric fields. As a result, phases of optical signals that propagate through the arms are changed, so that the optical signals are modulated in accordance with a phase difference between the arms. Furthermore, the MZM heater 23B causes a temperature difference to occur between the arms in the MZM 23A, causes an optical path difference to occur between the arms due to occurrence of the temperature difference, causes a phase difference to occur between the arms, and adjusts a phase amount of an optically modulated signal. Then, the MZM 23A applies voltage to the optical signal from the LD 10 and outputs an optically modulated signal.

The open-close unit 24 includes a shutter 24A and a shutter heater 24B. The shutter 24A adjusts the phase amount of the optically modulated signal coming from the MZM 23A, and turns on and off output of the optically modulated signal from the MZM 23A. The shutter heater 24B applies heat to the shutter 24A to adjust the phase amount of the optically modulated signal.

The apparatus thermistor 41 performs voltage conversion on temperature inside the optical transmission apparatus 1. The apparatus temperature monitor 42 detects voltage corresponding to the temperature inside the optical transmission apparatus 1 through the apparatus thermistor 41, and acquires apparatus temperature inside the optical transmission apparatus 1 corresponding to the voltage.

The control unit 30 includes a PD monitor 31, an LD current setting unit 32, an optical modulator temperature monitor 33, an MZM heater current setting unit 34, a switching determination unit 35, a shutter heater current setting unit 36, and a current control switching unit 37. The PD monitor 31 detects an output level of the optical signal of the LD 10, which is a PD monitoring result corresponding to a current value that is detected by the PD 21 in the optical modulator 20. The LD current setting unit 32 performs LD current control of setting a bias current to be supplied to the LD 10. The LD current control includes auto temperature control (ATC) and auto power control (APC). The ATC is LD current control of setting a bias current that is supplied to the LD 10 such that the temperature of the optical modulator 20 reaches the second target temperature. The bias current that is supplied to the LD 10 at the time of the ATC is a bias current with a higher current value than a bias current that is supplied during operation. The APC is LD current control of setting a bias current that is supplied to the LD 10 such that the output level of the optical signal of the LD 10 reaches a target level. The LD current setting unit 32 performs the ATC such that the temperature of the optical modulator 20 reaches the second target temperature, and thereafter, if the temperature of the optical modulator 20 reaches the second target temperature, the LD current setting unit 32 switches from the ATC to the APC.

The optical modulator temperature monitor 33 detects voltage corresponding to the temperature inside the optical modulator 20 through the optical modulator thermistor 22, and acquires the temperature inside the optical modulator 20 corresponding to the voltage. The MZM heater current setting unit 34 sets a drive current to be supplied to the MZM heater 23B on the basis of the temperature inside the optical modulator 20 acquired by the optical modulator temperature monitor 33. The switching determination unit 35 controls ON and OFF of the shutter 24A on the basis of the temperature of the optical modulator 20 acquired by the optical modulator temperature monitor 33. The shutter heater current setting unit 36 sets a drive current to be supplied to the shutter heater 24B on the basis of a switching determination result of ON and OFF of the shutter 24A.

The current control switching unit 37 generates setting current information for adjusting the bias current to be supplied to the LD 10, on the basis of the output level of the optical signal obtained by the PD monitor 31, the temperature of the optical modulator 20 obtained by the optical modulator temperature monitor 33, the switching determination result obtained by the switching determination unit 35, and the apparatus temperature obtained by the apparatus temperature monitor 42. The current control switching unit 37 sets the setting current information in the LD current setting unit 32.

The current control switching unit 37, when detecting activation of the power supply of the optical transmission apparatus 1, starts the ATC of the LD current control of supplying a certain bias current, which is higher than a target bias current (target LD current) that is supplied at the time of operation, such that the temperature inside the optical modulator 20 converges to the second target temperature. Furthermore, if the temperature inside the optical modulator 20 converges to the second target temperature during execution of the ATC, the current control switching unit 37 switches to the APC of the LD current control such that the output level of the optical signal of the LD 10 is stabilized at the target level.

The current control switching unit 37 uses heat generated by the LD 10, which is one of most dominant disturbances that reduces a time taken until the temperature of the optical modulator 20 converges to the second target temperature. The bias current that is higher than the current supplied at the time of operation is supplied to the LD 10 such that the LD 10 is in an overheated state. As a result, because the LD 10 is in the overheated state, the temperature of the optical modulator 20 rapidly increases as compared to the comparative example, so that it is possible to largely reduce a time taken until the temperature of the optical modulator 20 converges to a thermal equilibrium state (second target temperature). In this case, to control output of excessively emitted light of the optical transmission apparatus 1 while the bias current of the LD 10 is increased as compared to a steady state (operating state), the shutter 24A that is arranged in the subsequent stage of the modulation unit 23 is turned on and output of an optically modulated signal of the excessively emitted light is blocked. Then, after the temperature of the optical modulator 20 converges to the second target temperature (thermal equilibrium state), the shutter 24A is turned off.

Figure 2:
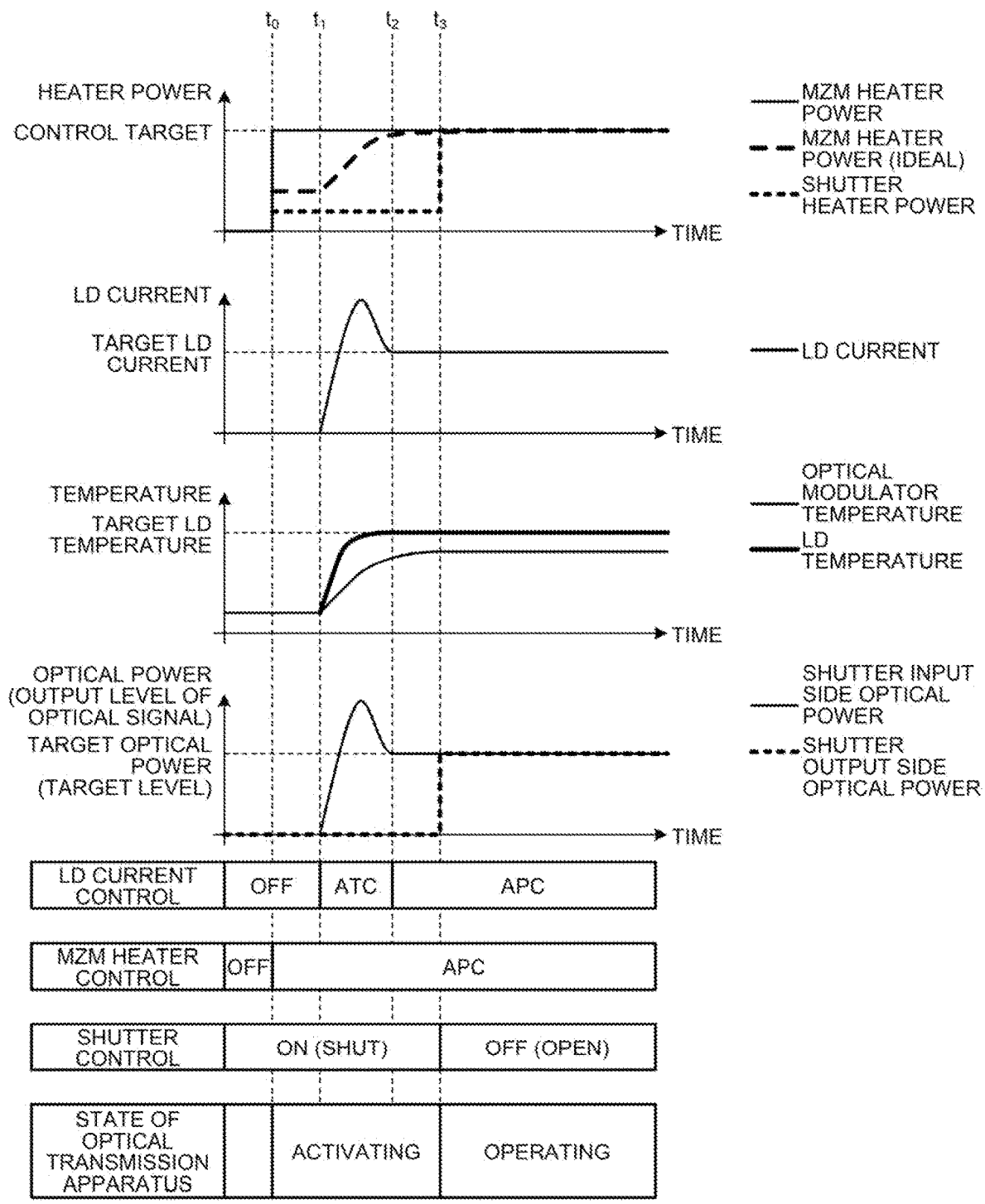
FIG. 2 is a diagram for explaining an example of temporal changes of heater power, an LD current, temperature, and optical output from start of activation of a power supply to start of operation of the optical transmission apparatus according to the first embodiment.

FIG. 2 is a diagram for explaining an example of temporal changes of the heater power, the LD current, the temperature, and the optical output from start of activation of the power supply to start of operation of the optical transmission apparatus 1 according to the first embodiment. A period from the start of activation of a power supply to the start of operation of the optical transmission apparatus 1 is divided by timings t0, t1, t2 and t3. t0 is a timing at which the power supply of the optical transmission apparatus 1 is activated and MZM heater control is started. t1 is a timing at which the LD current control of controlling the bias current to be supplied to the LD 10 is started. t2 is a timing at which the LD temperature of the LD 10 converges to the first target temperature (stabilized temperature). t3 is a timing at which the temperature of the optical modulator 20 converges to the second target temperature (stabilized temperature) and at which operation of the optical transmission apparatus 1 is started where the optical output is turned on.

The MZM heater 23B starts power control at the timing t0, and the shutter heater 24B starts power control at the timing t3. As for the LD current, supply of the bias current to the LD 10 is started from the timing t1, the bias current that is higher than a bias current supplied at the time of operation is supplied to the LD 10, and thereafter an output level of the LD current (bias current) is stabilized at the target LD current (target level).

The LD temperature increases in accordance with supply of the high bias current supplied to the LD 10 from the timing t1. Furthermore, optical modulator temperature increases in accordance with the high bias current that is supplied to the LD 10 from the timing t1, and the temperature of the optical modulator 20 converges to the stabilized temperature (second target temperature) at the timing t2.

The output level (optical power) of the optical signal increases in accordance with the supply of the high bias current to the LD 10 along with the start of the LD current control at the timing t1. As for the output level of the optical signal, if the temperature of the optical modulator 20 reaches nearly the second target temperature and the LD current is stabilized at the target LD current, the output level of the optical signal converges to the target optical power (target level). Further, as for the shutter 124A, if the temperature of the optical modulator 20 reaches the second target temperature and the output level of the optical signal converges to the target level, the shutter 124A is turned off at the timing t3 to allow the optically modulated signal with the target optical power to be output.

As the LD current control by the current control switching unit 37, the ATC of the LD current control is started in accordance with the timing t1 in the OFF state. At this time, the LD current setting unit 32 starts the LD current control for the ATC for supplying, to the LD 10, a higher bias current than a current supplied at the time of operation until the temperature of the optical modulator 20 converges to the second target temperature. The current control switching unit 37 switches the ATC of the LD current control to the APC in accordance with the timing t2 at which the temperature of the optical modulator 20 converges to the second target temperature. In this case, the LD current setting unit 32 switches from the ATC to the APC such that the output level of the optically modulated signal is stabilized at the target level.

As the MZM heater control by the MZM heater current setting unit 34, APC of the MZM heater control is started in accordance with the timing t0 in the OFF state. As shutter control by the switching determination unit 35, an ON state is normally set and an OFF state is set in accordance with the timing t3. Meanwhile, the output of the optically modulated signal of the modulation unit 23 is turned off when the shutter 24A is turned on, and the output of the optically modulated signal of the modulation unit 23 is turned on when the shutter 24A is turned off. As a state of the optical transmission apparatus 1, activation is started at the timing t0 and the activation state is switched to an operating state in accordance with the timing t3.

The optical transmission apparatus 1, when detecting activation of the power supply, performs the ATC of the LD current control such that the temperature of the optical modulator 20 converges to the second target temperature before start of the APC of the LD current control on the LD 10. In other words, the optical transmission apparatus 1 starts to current control on the MZM heater 23B at the timing t0, starts the ATC of the LD current control at the timing t1, and switches to the APC of the LD current control if the temperature of the optical modulator 20 converges to the second target temperature.

Figure 3:
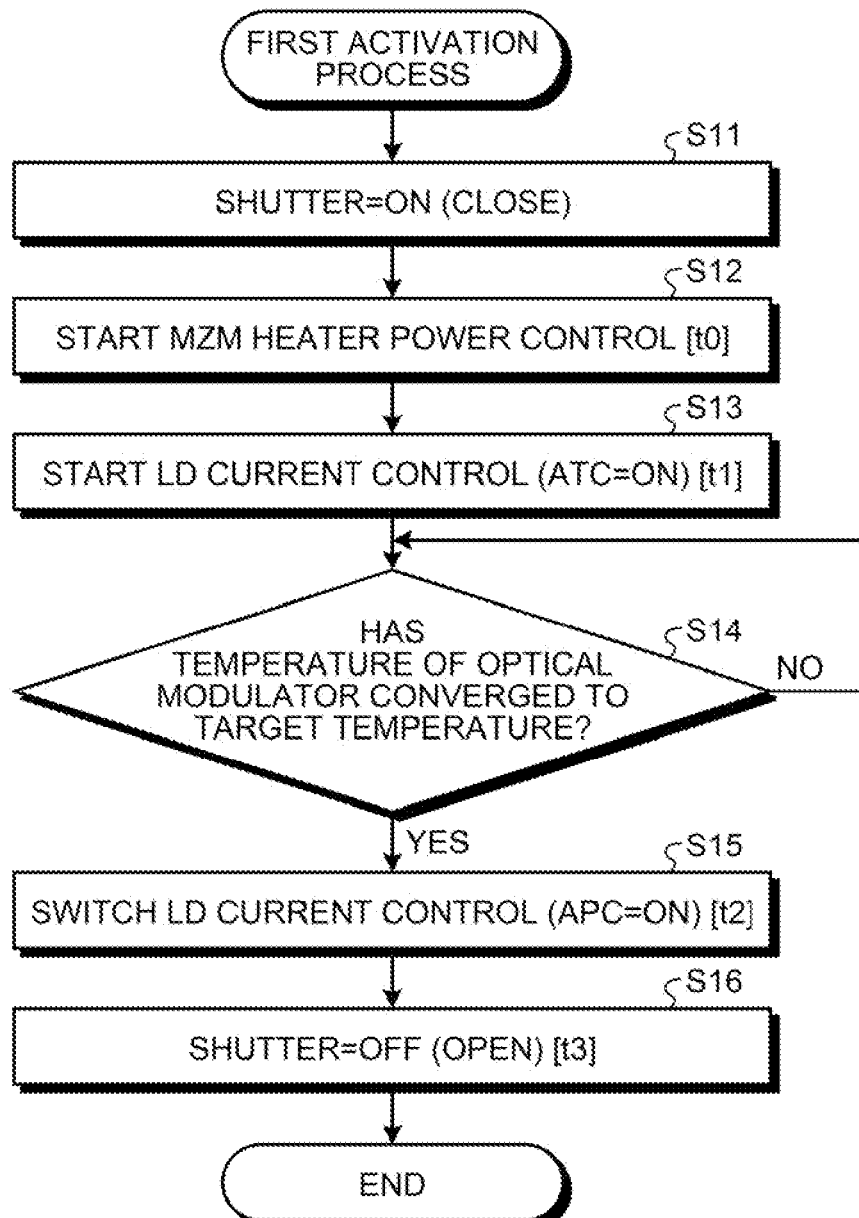
FIG. 3 is a flowchart illustrating an example of processing operation related to a first activation process of the optical transmission apparatus according to the first embodiment.

FIG. 3 is a flowchart illustrating an example of processing operation related to a first activation process performed by the optical transmission apparatus 1 according to the first embodiment. The switching determination unit 35 in the optical transmission apparatus 1 changes a state of the shutter 24A to the ON state and stops output of the optically modulated signal from the modulation unit 23 in accordance with activation of the power supply (Step S11). The MZM heater current setting unit 34 in the optical transmission apparatus 1 starts the power control on the MZM heater 23B when the shutter 24A is in the ON state (Step S12). The MZM heater current setting unit 34 starts APC of the power control on the MZM heater 23B at the timing t0.

The LD current setting unit 32 in the optical transmission apparatus 1, after the MZM heater power control is started, starts the ATC of the LD current control of supplying, to the LD 10, a higher bias current than a current supplied at the time of operation in order to start the LD current control (Step S13). Meanwhile, the LD current setting unit 32 starts the ATC of the LD current control at the timing t1.

The current control switching unit 37 in the optical transmission apparatus 1 determines, for example, whether the temperature inside the optical modulator 20 has converged to the second target temperature (stabilized temperature) (Step S14). If the temperature inside the optical modulator 20 has converged to the second target temperature (Step S14: Yes), the current control switching unit 37 switches from the ATC to the APC as the LD current control (Step S15). The current control switching unit 37 causes the LD current setting unit 32 to switch from the ATC to the APC at the timing t3.

Furthermore, after switching to the APC of the LD current control, the switching determination unit 35 in the optical transmission apparatus 1 turns off the shutter 24A to start to output the optically modulated signal from the modulation unit 23 (Step S16), and terminates the processing operation illustrated in FIG. 3. If the temperature inside the optical modulator 20 has not converged to the second target temperature (Step S14: No), the optical transmission apparatus 1 returns to Step S14 to determine whether the temperature inside the optical modulator 20 has converged to the second target temperature.

The optical transmission apparatus 1 according to the first embodiment, when detecting activation of the power supply, supplies a certain bias current, which is higher than a bias current that is supplied to the LD 10 at the time of operation, to the LD 10 such that the temperature inside the optical modulator 20 converges to the second target temperature. As a result, by increasing the supply of the bias current to the LD 10 to reduce a time taken until the temperature of the optical modulator 20 converges to the second target temperature, it is possible to reduce a start-up time of the optical transmission apparatus 1.

The example has been described in which the current control switching unit 37 according to the first embodiment, when detecting activation of the power supply, starts the ATC of the LD current control of supplying a certain bias current, which is higher than a bias current that is supplied at the time of operation, to the LD 10 at the timing t1. However, as another embodiment in which the bias current supplied to the LD 10 at the timing t1 is set to a bias current with an upper limit value that is acceptable to the LD 10 will be described below as a second embodiment. Meanwhile, the same components as those of the optical transmission apparatus 1 of the first embodiment are denoted by the same reference symbols, and explanation of the same configurations and operation will be omitted.

[b] Second Embodiment

The current control switching unit 37 in the optical transmission apparatus 1 according to the second embodiment, when detecting activation of the power supply of the optical transmission apparatus 1, sets a bias current with an upper limit value that is acceptable to the LD 10, as the bias current to be supplied to the LD 10. The current control switching unit 37, when detecting activation of the power supply of the optical transmission apparatus 1, starts the ATC of the LD current control of supplying the bias current with the upper limit value to the LD 10 until the temperature of the optical modulator 20 converges to the second target temperature. Furthermore, if the temperature of the optical modulator 20 converges to the second target temperature during execution of the ATC of the LD current control, the current control switching unit 37 switches to the APC of the LD current control of controlling the bias current supplied to the LD 10 such that the output level of the optical signal reaches the target level.

Figure 4:
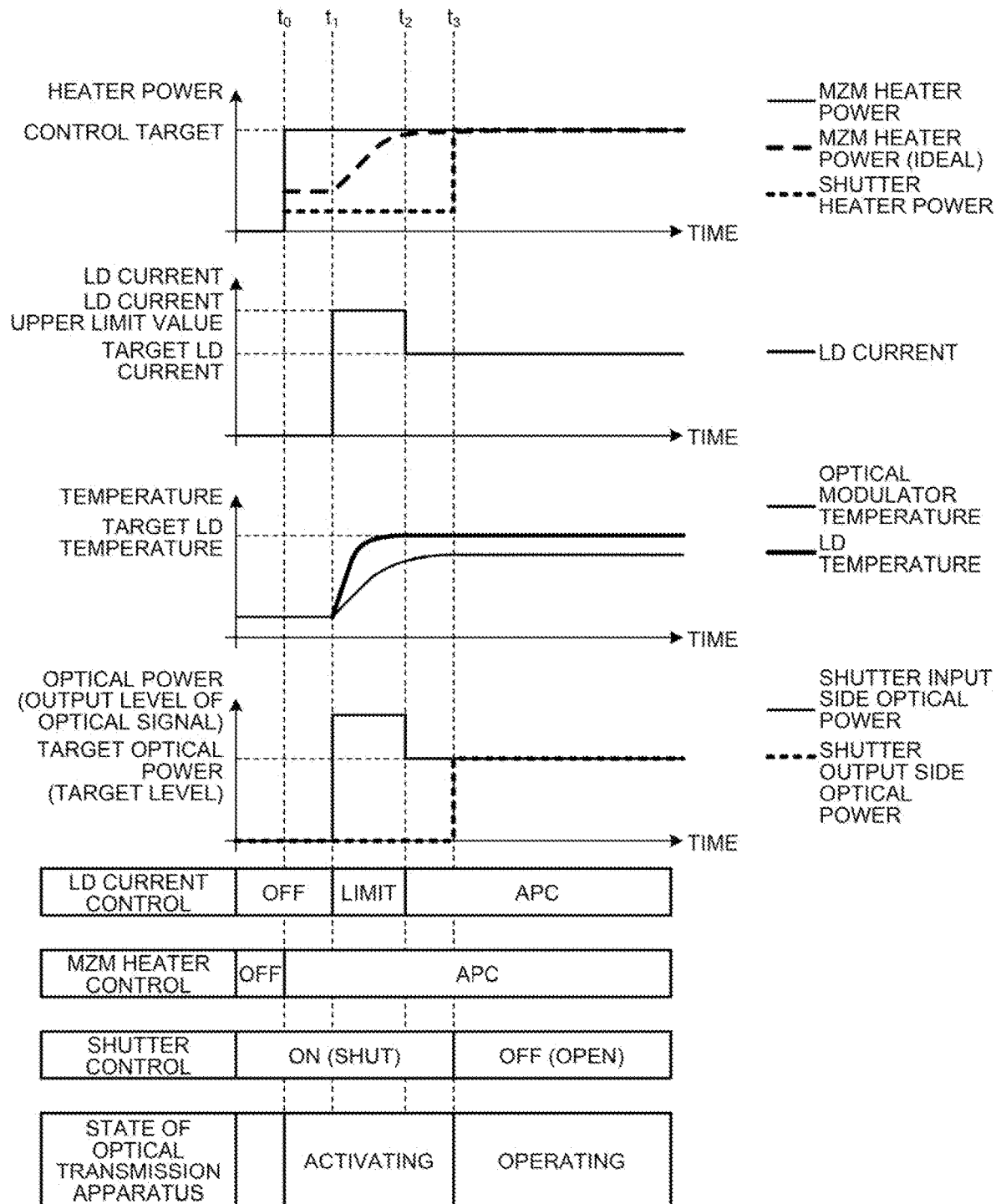
FIG. 4 is a diagram for explaining an example of temporal changes of heater power, an LD current, temperature, and optical output from start of activation of a power supply to start of operation of the optical transmission apparatus according to the second embodiment.

FIG. 4 is a diagram for explaining an example of temporal changes of the heater power, the LD current, the temperature, and the optical output from start of activation of the power supply to start of operation of the optical transmission apparatus 1 according to the second embodiment. By supplying the bias current with the upper limit value to the LD 10 before execution of the APC on the bias current to the LD 10, the LD 10 enters an overheated state. Meanwhile, the overheated state of the LD 10 is temperature that is acceptable to the LD 10.

As the MZM heater control by the MZM heater current setting unit 34, power control on the MZM heater 23B is started at the timing t0. The current control switching unit 37 starts the ATC of the LD current control of supplying the bias current with the upper limit value to the LD 10 at the timing t1. Furthermore, if the temperature of the optical modulator 20 converges to the second target temperature, the current control switching unit 37 switches to the APC of the LD current control such that the output level of the optical signal of the LD 10 reaches the target level.

Figure 5:
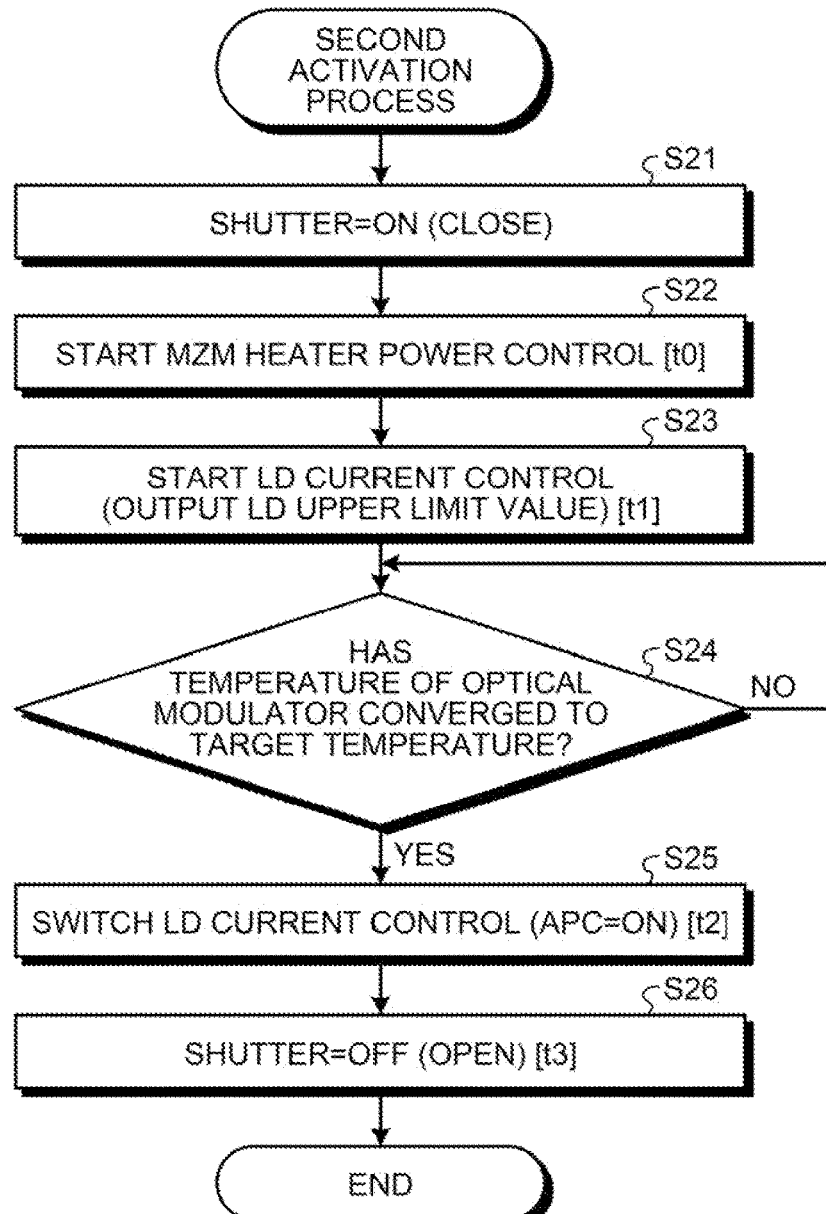
FIG. 5 is a flowchart illustrating an example of processing operation related to a second activation process of the optical transmission apparatus according to the second embodiment.

FIG. 5 is a flowchart illustrating an example of processing operation related to a second activation process performed by the optical transmission apparatus 1 according to the second embodiment. The switching determination unit 35 in the optical transmission apparatus 1 changes a state of the shutter 24A to the ON state and stops output of the optically modulated signal from the modulation unit 23 in accordance with activation of the power supply (Step S21). The MZM heater current setting unit 34 in the optical transmission apparatus 1 starts the power control on the MZM heater 23B when the shutter 24A is in the ON state (Step S22). The MZM heater current setting unit 34 starts APC of the power control on the MZM heater 23B at the timing t0.

The LD current setting unit 32 in the optical transmission apparatus 1, after the MZM heater power control is started, starts the ATC of the LD current control of supplying, to the LD 10, the bias current with the upper limit value to start the LD current control (Step S23). The current control switching unit 37 in the optical transmission apparatus 1, for example, determines whether the temperature inside the optical transmission apparatus 1 has converged to the second target temperature (stabilized temperature) in a state in which the ATC of supplying the bias current with the upper limit value to the LD 10 is performed (Step S24).

If the temperature inside the optical modulator 20 has converged to the second target temperature (stabilized temperature) (Step S24: Yes), the current control switching unit 37 in the optical transmission apparatus 1 switches from the ATC to the APC of the LD current control (Step S25). Furthermore, after switching to the APC, the switching determination unit 35 in the optical transmission apparatus 1 turns off the shutter 24A to start to output the optically modulated signal from the modulation unit 23 (Step S26), and terminates the processing operation illustrated in FIG. 5. If the temperature inside the optical modulator 20 has not converged to the second target temperature (Step S24: No), the optical transmission apparatus 1 returns to Step S24 to determine whether the temperature inside the optical modulator 20 has converged to the second target temperature.

The optical transmission apparatus 1 of the second embodiment starts the ATC of the LD current control of supplying the bias current with the upper limit value to the LD 10 until the temperature inside the optical modulator 20 converges to the second target temperature is started. Furthermore, after the temperature inside the optical modulator 20 has converged to the second target temperature, the optical transmission apparatus 1 switches to the APC of the LD current control of setting the bias current supplied to the LD 10 such that the output level of the optical signal reaches the target level. As a result, by supplying the bias current with the upper limit value to the LD 10 to reduce a time taken until the temperature of the optical modulator 20 converges to the second target temperature, it is possible to reduce a start-up time of the optical transmission apparatus 1.

Meanwhile, the example has been described in which the optical transmission apparatus 1 of the second embodiment supplies the bias current with the upper limit value to the LD 10 until the temperature inside the optical modulator 20 converges to the second target temperature, and switches from the ATC to the APC if the temperature of the optical modulator 20 converges to the second target temperature. Further, the example has been described in which a criterion for determining switching to the APC of the LD current control is based on whether the temperature inside the optical modulator 20 converges to the second target temperature. However, it may be possible to calculate a supply time that is taken to supply the bias current with the upper limit value to the LD 10 until the temperature inside the optical modulator 20 converges to the second target temperature, and switch from the ATC to the APC of the LD current control on the basis of the supply time for which the bias current with the upper limit value is supplied to the LD 10. This embodiment will be described below as a third embodiment.

[c] Third Embodiment

The optical transmission apparatus 1 according to the third embodiment calculates a supply time (t2−t1) for supplying the bias current with the upper limit value to the LD 10, on the basis of a difference between current temperature of the optical modulator 20 at the time of start of temperature control on the optical modulator 20 and the second target temperature, a factor that is acquired in advance and that imposes an influence of disturbance on the optical modulator 20, thermal resistance of the optical modulator 20, and time constant information on the disturbance.

Figure 6:
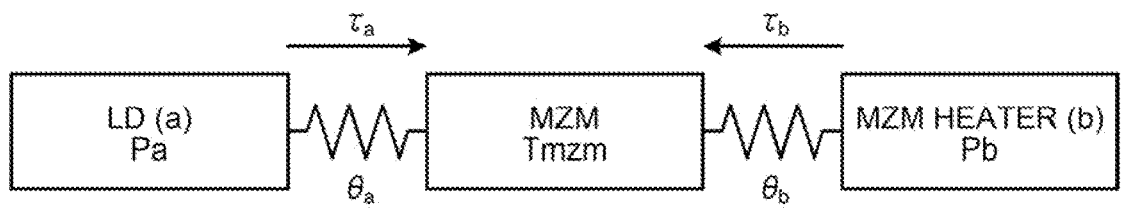
FIG. 6 is a diagram for explaining an example of a thermal model related to the optical transmission apparatus according to the third embodiment.

FIG. 6 is a diagram for explaining an example of a thermal model related to the optical transmission apparatus 1 according to the third embodiment. The thermal model includes LD stationary power consumption (Pa) of the LD 10, MZM temperature (Tmzm) of the MZM 23A in an equilibrium state, MZM heater stationary power consumption (Pb) of the MZM heater 23B, and thermal resistance θa between the LD 10 and the MZM 23A. Furthermore, the thermal model includes thermal resistance θb between the MZM 23A and the MZM heater 23B.

FIG. 7 is a diagram for explaining an example of an MZM temperature relational expression of the third embodiment. Pa is stationary power consumption [W] of the LD 10, Palimit is an upper limit [W] of the power consumption of the LD 10, and Pb is stationary power consumption [W] of the MZM heater 23B. Tmzm is temperature [° C.] of the MZM 23A in the equilibrium state, Tmzm0 is initial temperature [° C.] of the MZM 23A, θa is thermal resistance [° C./W] between the LD 10 and the MZM 23A, and θb is thermal resistance [° C./W] between the MZM 23A and the MZM heater 23B. Ta is increasing temperature [° C.] that is given by the LD 10 to the MZM 23A, Tb is increasing temperature [° C.] that is given by the MZM heater 23B to the MZM 23A, τa is a time constant [sec] of thermal conduction from the LD 10 to the MZM 23A, and τb is a time constant [sec] of thermal conduction from the MZM heater 23B to the MZM 23A.

The temperature Tmzm increases with the influence of heat generated by the LD 10 and the MZM heater 23B. The control unit 30 in the optical transmission apparatus 1 calculates the timing t2 at which the temperature of the optical modulator 20 reaches the second target temperature in the time chart in FIG. 4. At the timing t1, the power control on the LD 10 and the MZM heater 23B is started, and the temperature of the MZM 23A increases with the influence of the power control. Meanwhile, Pa, Palimit, Pb, Tmzm, Tmzm0, θa, θb, τa, and τb are already known.

By solving an equation Tmzm(t1≤t<t2)=T(∞) by t (=t2), Tmzm (t2) reaches the convergence temperature of the MZM 23A, so that t2 is set optimally. Then, the supply time is calculated by (t2−t1).

Figure 8:
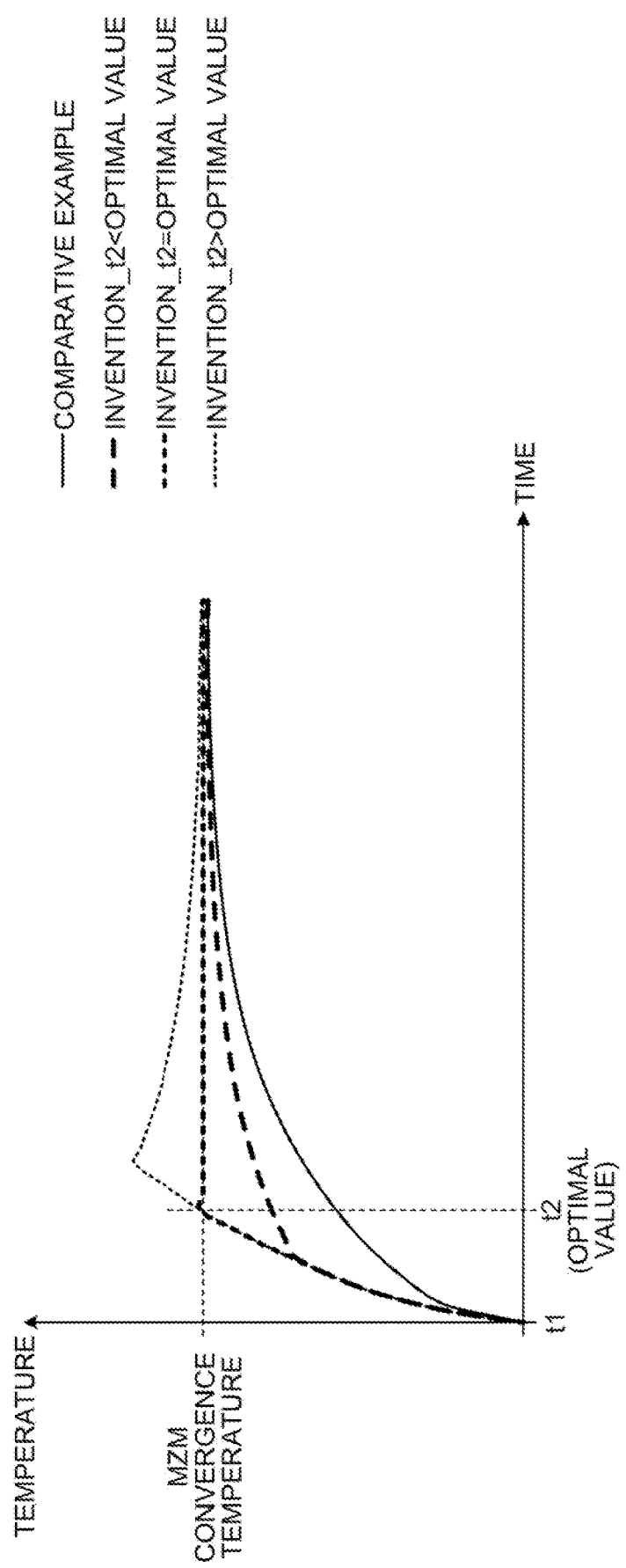
FIG. 8 is a diagram for explaining an example of a temperature change from start of activation of the MZM to temperature convergence according to the third embodiment.

FIG. 8 is a diagram for explaining an example of a temperature change from start of activation to temperature convergence of the MZM 23A according to the third embodiment. If the time (t2−t1) before switching from the ATC to the APC of the LD current control of supplying the bias current with the upper limit value to the LD 10 is too short (t2<optimal value), switching to the APC is performed in a state in which the temperature Tmzm of the MZM 23A is smaller than the target temperature (MZM convergence temperature). As a result, switching to the APC is performed before the temperature Tmzm of the MZM 23A converges to the target temperature (MZM convergence temperature).

Further, if the time (t2−t1) is too long (t2>optimal value), the LD current control is switched from the ATC to the APC in a state in which the temperature Tmzm of the MZM 23A exceeds the target temperature (MZM convergence temperature). As a result, switching to the APC is performed in the state in which the temperature Tmzm of the MZM 23A exceeds the target temperature (MZM convergence temperature). Therefore, if the time (t2−t1) has an optimal value (t2=optimal value), it is possible to switch to the APC in which the temperature Tmzm of the MZM 23A is stabilized at the target temperature (MZM convergence temperature).

Figure 9:
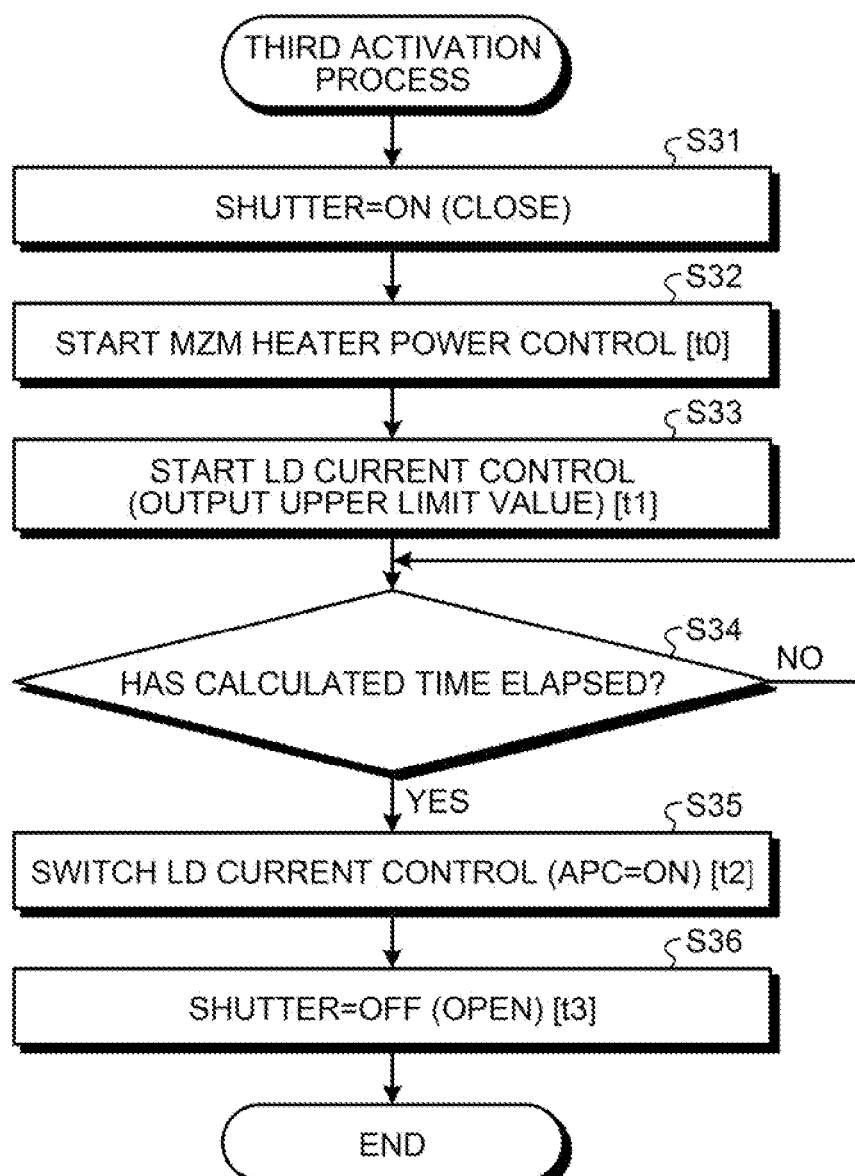
FIG. 9 is a flowchart illustrating an example of processing operation related to a third activation process of the optical transmission apparatus according to the third embodiment.

FIG. 9 is a flowchart illustrating an example of processing operation related to a third activation process performed by the optical transmission apparatus 1 of the third embodiment. The switching determination unit 35 in the optical transmission apparatus 1 changes a state of the shutter 24A to the ON state and stops output of the optically modulated signal from the modulation unit 23 in accordance with activation of the power supply (Step S31). The MZM heater current setting unit 34 in the optical transmission apparatus 1 starts the power control on the MZM heater 23B when the shutter 24A is in the ON state (Step S32). The MZM heater current setting unit 34 starts APC of the power control on the MZM heater 23B at the timing t0.

The LD current setting unit 32 in the optical transmission apparatus 1, after the MZM heater power control is started, starts the LD current control of supplying the bias current with the upper limit value to the LD 10 to start the LD current control (Step S33). The current control switching unit 37 in the optical transmission apparatus 1 determines, for example, whether a calculated time that is the supply time has elapsed since start of supply of the bias current with the upper limit value at Step S33, in the state in which the bias current with the upper limit value is supplied to the LD 10 (Step S34).

If the calculated time has elapsed (Step S34: Yes), the current control switching unit 37 in the optical transmission apparatus 1 switches to the APC of the LD current control (Step S35). Furthermore, after switching to the APC, the switching determination unit 35 in the optical transmission apparatus 1 turns off the shutter 24A, starts to output the optically modulated signal from the modulation unit 23 (Step S36), and terminates the processing operation illustrated in FIG. 9. If the calculated time has not elapsed since start of supply of the bias current with the upper limit value at Step S33 (Step S34: No), the optical transmission apparatus 1 returns to Step S32 to determine whether the calculated time has elapsed.

In the optical transmission apparatus 1 according to the third embodiment, the bias current with the upper limit value is supplied to the LD 10 for the calculated time that is calculated in advance, so that the temperature inside the optical modulator 20 converges to the second target temperature after a lapse of the calculated time since start of supply of the bias current with the upper limit value without performing the ATC. Further, after the temperature inside the optical modulator 20 has converged to the second target temperature, the optical transmission apparatus 1 performs the APC of the LD current control of controlling the bias current supplied to the LD 10 such that the output level of the optical signal reaches the target level. As a result, by supplying the bias current with the upper limit value to the LD 10 to reduce a time take until the temperature of the optical modulator 20 converges to the second target temperature, it is possible to reduce a start-up time of the optical transmission apparatus 1.

Meanwhile, the example has been described in which, in the optical transmission apparatus 1 according to the the third embodiment, the single modulation unit 23 optically modulates the single LD 10, and the output of the optically modulated signal is turned on and off by the shutter 24A, but the embodiment is not limited to the single LD 10, and another embodiment will be described below as a fourth embodiment.

[d] Fourth Embodiment

Figure 10:
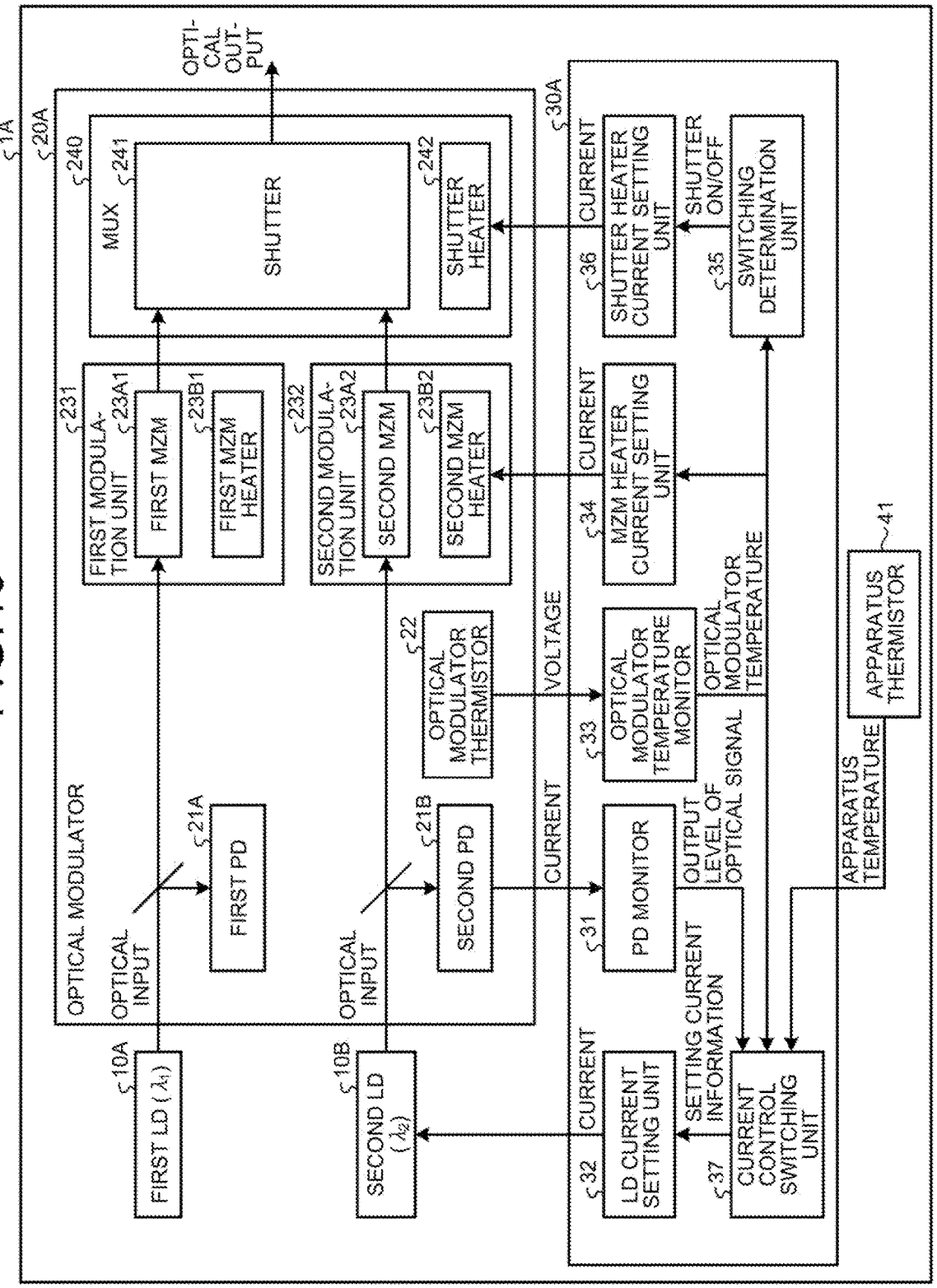
FIG. 10 is a block diagram of illustrating an example of the optical transmission apparatus according to the fourth embodiment.

FIG. 10 is a block diagram illustrating an example of an optical transmission apparatus 1A according to the fourth embodiment. The optical transmission apparatus 1A illustrated in FIG. 10 includes a first LD 10A and a second LD 10B. An optical modulator 20A includes a first PD 21A, a first modulation unit 231, a second PD 21B, a second modulation unit 232, and a MUX 240. A control unit 30A includes a current control switching unit 37 in addition to the PD monitor 31, the LD current setting unit 32, the optical modulator temperature monitor 33, the MZM heater current setting unit 34, the switching determination unit 35, and the shutter heater current setting unit 36. Meanwhile, an LD current setting unit that supplies an electric current to the first LD 10A, a PD monitor that monitors a PD current of the first PD 21A, and an MZM heater current setting unit that supplies an electric current to a first MZM heater 23B1 are not illustrated for convenience of explanation; however, it is assumed that the other LD current setting unit 32 that supplies an electric current to the first LD 10A, the other PD monitor 31 that monitors the PD current of the first PD 21A, and the other MZM heater current setting unit 34 that supplies an electric current to the first MZM heater 23B1 are arranged in the control unit 30A.

The first LD 10A emits a first optical signal with a first wavelength in accordance with a bias current. The first PD 21A performs current conversion on the first optical signal from the first LD 10A, and detects a first output level of the optical signal subjected to the current conversion. The first modulation unit 231 includes a first MZM 23A1 and the first MZM heater 23B1. The first MZM 23A1 applies voltage and optically modulates the first optical signal. The first MZM heater 23B1 causes a temperature difference to occur between arms in the first MZM 23A1, causes an optical path difference to occur between the arms in accordance with occurrence of the temperature difference, and adjusts a phase difference between the arms. Then, the first MZM 23A1 applies voltage to the first optical signal from the first LD 10A and outputs a first optically modulated signal.

The second LD 10B emits a second optical signal with a second wavelength in accordance with the bias current. The second PD 21B performs current conversion on the second optical signal from the second LD 10B, and detects a second output level of the optical signal subjected to the current conversion. The second modulation unit 232 includes a second MZM 23A2 and a second MZM heater 23B2. The second MZM 23A2 applies voltage and optically modulates the second optical signal. The second MZM heater 23B2 causes a temperature difference to occur between arms in the second MZM 23A2, causes an optical path difference to occur between the arms in accordance with occurrence of the temperature difference, and adjusts a phase difference between the arms. Then, the second MZM 23A2 applies voltage to the second optical signal from the second LD 10B and outputs a second optically modulated signal.

A shutter 241 in the MUX 240 turns on and off output of the first optically modulated signal from the first MZM 23A1 and turns on and off output of the second optically modulated signal from the second MZM 23A2 by adjusting the phase amount of the first optically modulated signal or the second optically modulated signal. A shutter heater 242 applies heat to the shutter 241 to adjust the phase amount of the first optically modulated signal or the second optically modulated signal. The MUX 240 outputs the first optically modulated signal subjected to the optical modulation and/or the second optically modulated signal subjected to the optical modulation. As a result, the MUX 240 is able to turns on and off the output of the first optically modulated signal or the second optically modulated signal by adjusting the phase amount of the first optically modulated signal or the second optically modulated signal by applying heat to the shutter 241 by the shutter heater 242.

The optical transmission apparatus 1A according to the fourth embodiment, when detecting activation of the power supply, starts the ATC of the LD current control of supplying, to the LD 10, a higher bias current than a bias current that is supplied at the time of operation until the temperature inside the optical modulator 20A converges to the second target temperature. Furthermore, after the temperature inside the optical modulator 20A converges to the second target temperature, the optical transmission apparatus 1A switches to the APC of the LD current control of setting the bias current to be supplied to the LD 10 such that the output level of the optical signal reaches the target level. As a result, by increasing supply of the bias current to the LD 10 to reduce a time taken until the temperature of the optical modulator 20A converges to the second target temperature, it is possible to reduce a start-up time of the optical transmission apparatus 1A.

Meanwhile, the example has been descried in which the optical transmission apparatus 1 of the first embodiment adjusts the bias current supplied to the LD 10 such that the temperature of the optical modulator 20 converges to the second target temperature. However, it may be possible to adjust an optical modulator heater 25 that adjusts the temperature of the optical modulator 20 instead of adjusting the bias current supplied to the LD 10, and this embodiment will be described below as a fifth embodiment. Meanwhile, the same components as those of the optical transmission apparatus 1 of the first embodiment are denoted by the same reference symbols, and explanation of the same configurations and operation will be omitted.

[e] Fifth Embodiment

Figure 11:
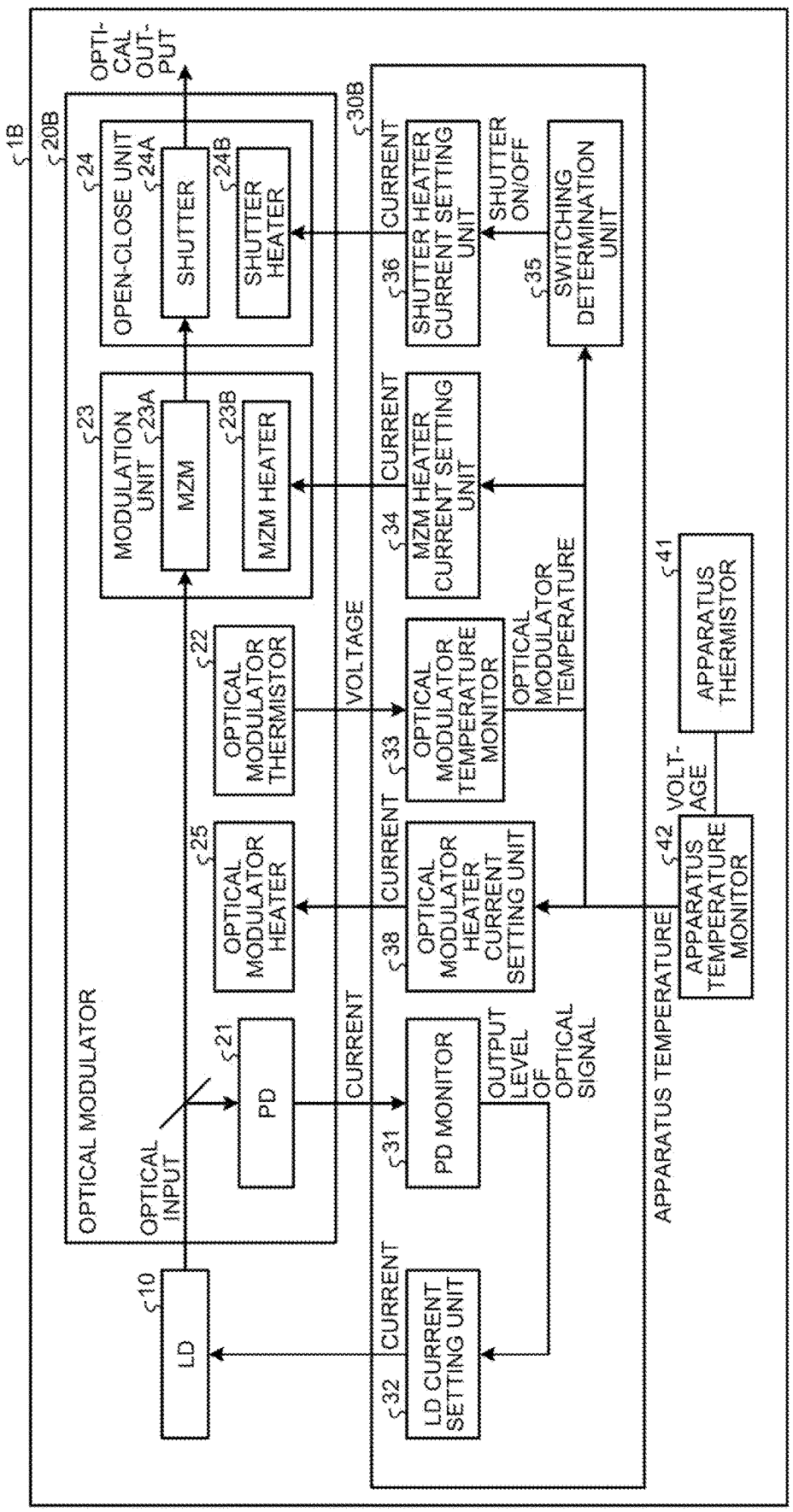
FIG. 11 is a block diagram illustrating an example of an optical transmission apparatus according to a fifth embodiment.

FIG. 11 is a block diagram illustrating an example of an optical transmission apparatus 1B according to the fifth embodiment. An optical modulator 20B in the optical transmission apparatus 1B illustrated in FIG. 11 includes the optical modulator heater 25 that heats a main body of the optical modulator 20B. A control unit 30B in the optical transmission apparatus 1B includes an optical modulator heater current setting unit 38 that supplies a drive current to the optical modulator heater 25, instead of the current control switching unit 37.

The optical modulator heater current setting unit 38 sets a drive current that is supplied to the optical modulator heater 25, on the basis of temperature of the optical modulator 20B obtained by the optical modulator temperature monitor 33, a switching determination result obtained by the switching determination unit 35, and temperature of the optical transmission apparatus 1B obtained by the apparatus temperature monitor 42. The optical modulator heater current setting unit 38 sets the drive current supplied to the optical modulator heater 25 such that the temperature of the optical modulator 20B converges to the second target temperature.

Figure 12:
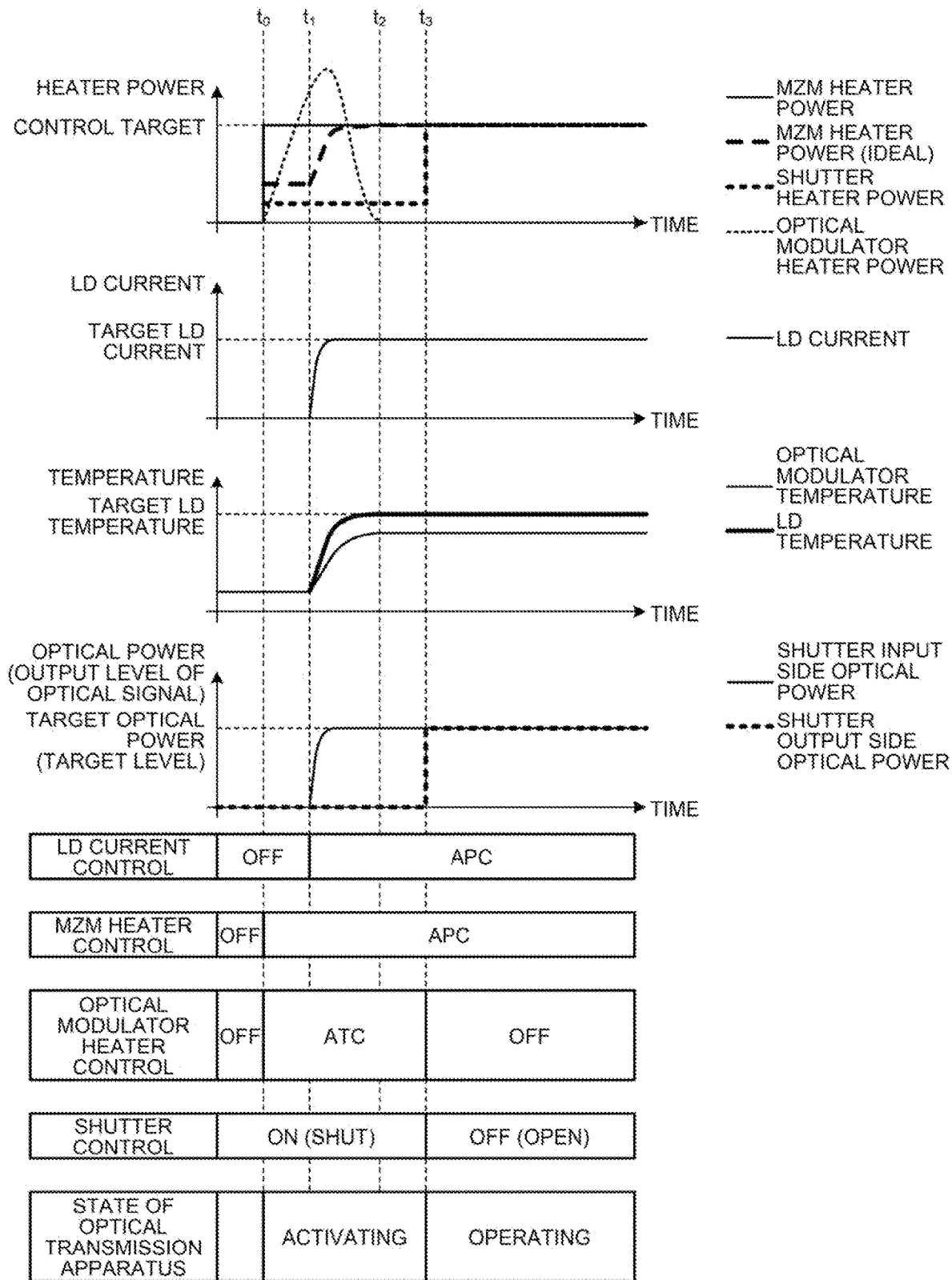
FIG. 12 is a diagram for explaining an example of temporal changes of heater power, an LD current, temperature, and optical output from start of activation of a power supply to start of operation of the optical transmission apparatus according to the fifth embodiment.

FIG. 12 is a diagram for explaining an example of temporal changes of the heater power, the LD current, the temperature, and the optical output from start of activation of the power supply to start of operation of the optical transmission apparatus 1B of the fifth embodiment. At the timing t0, power control on the MZM heater 23B and the optical modulator heater 25 is started.

The LD current setting unit 32 starts the APC of the LD current control in accordance with the timing t1 in the OFF state. As the MZM heater control by the MZM heater current setting unit 34, the APC of the MZM heater control is started in accordance with the timing t0. The optical modulator heater current setting unit 38 starts APC of optical modulator heater control in accordance with the timing t0 such that the temperature of the optical modulator 20B converges to the second target temperature, and if the temperature of the optical modulator 20B converges to the second target temperature, the optical modulator heater 25 is turned off. As shutter control by the switching determination unit 35, an ON state is normally set and an OFF state is set in accordance with the timing t3. Meanwhile, the output of the optically modulated signal of the modulation unit 23 is turned off when the shutter 24A is turned on, and the output of the optically modulated signal of the modulation unit 23 is turned on when the shutter 24A is turned off. As a state of the optical transmission apparatus 1, activation is started at the timing t0 and the activation state is switched to an operating state in accordance with the timing t3.

The optical transmission apparatus 1B, when detecting activation of the power supply, starts the ATC of the optical modulator heater control such that the temperature of the optical modulator 20B converges to the second target temperature. Then, if the temperature of the optical modulator 20 converges to the second target temperature, the ATC of the optical modulator heater control is turned off. As a result, by applying heat to the optical modulator heater 25 to reduce a time taken until the temperature of the optical modulator 20B converges to the second target temperature, it is possible to reduce a start-up time of the optical transmission apparatus 1B.

Figure 13:
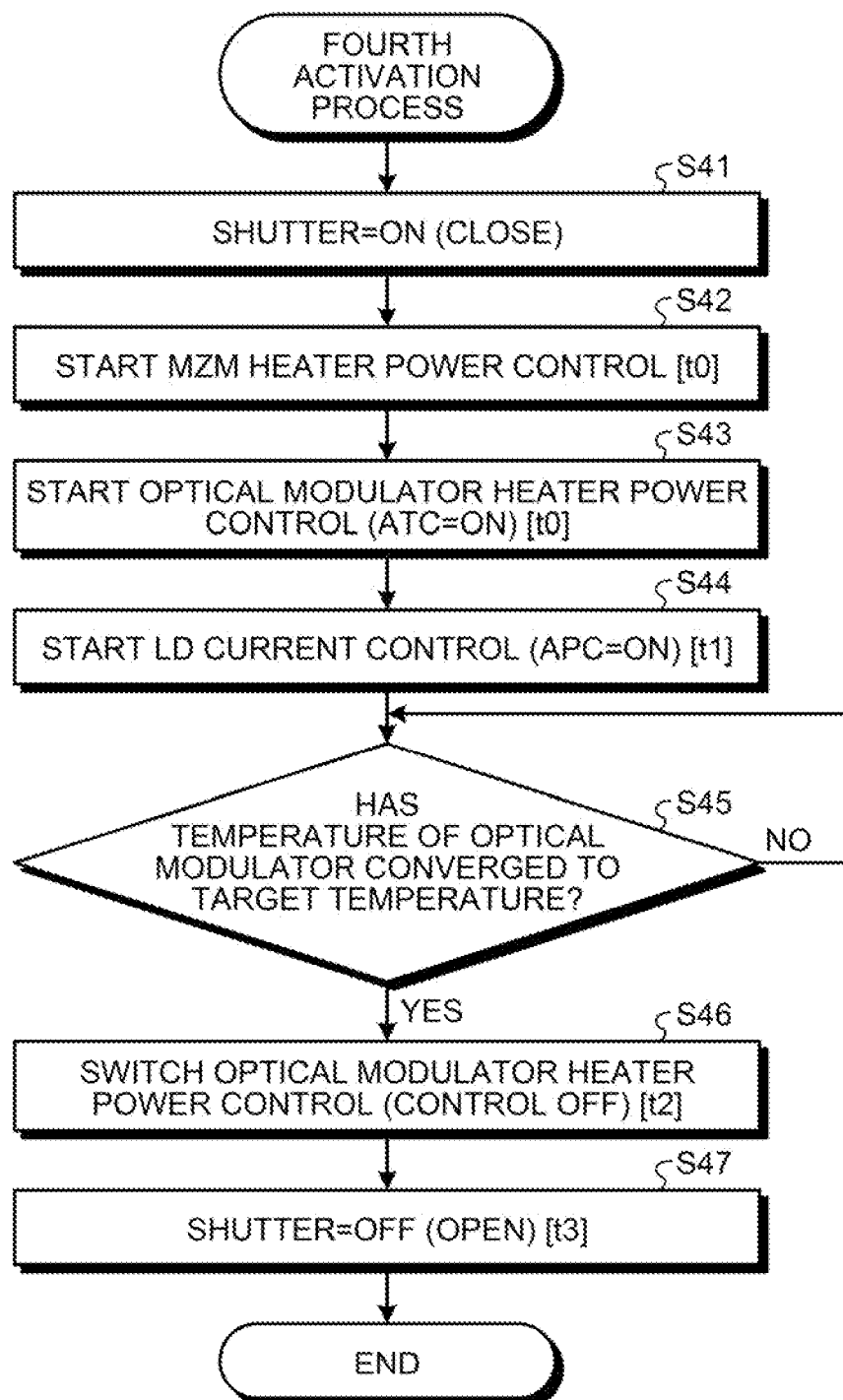
FIG. 13 is a flowchart illustrating an example of processing operation related to a fourth activation process of the optical transmission apparatus according to the fifth embodiment.

FIG. 13 is a flowchart illustrating an example of processing operation related to a fourth activation process performed by the optical transmission apparatus 1B according to the fifth embodiment. The switching determination unit 35 in the optical transmission apparatus 1B turns on the shutter 24A and stops output of the optically modulated signal from the modulation unit 23 in accordance with activation of the power supply (Step S41). The MZM heater current setting unit 34 in the optical transmission apparatus 1B starts the power control on the MZM heater 23B when the shutter 24A is in the ON state (Step S42). The MZM heater current setting unit 34 starts APC of the power control on the MZM heater 23B at the timing t0.

The optical modulator heater current setting unit 38 in the optical transmission apparatus 1B, after the MZM heater power control is started, starts the ATC of the power control on the optical modulator heater 25 (Step S43). Meanwhile, as for the optical modulator 20B, the temperature inside the optical modulator 20B increases with the power control on the optical modulator heater 25. Furthermore, the LD current setting unit 32 in the optical transmission apparatus 1B starts the APC of the LD current control (Step S44). The optical transmission apparatus 1B determines whether the temperature of the optical modulator 20B has converged to the second target temperature (Step S45).

If the temperature inside the optical modulator 20B has converged to the second target temperature (Step S45: Yes), the optical modulator heater current setting unit 38 in the optical transmission apparatus 1B turns off the ATC of the optical modulator heater power control (Step S46). Furthermore, the switching determination unit 35 in the optical transmission apparatus 1B turns off the optical modulator heater power control, thereafter turns off the shutter 24A to start to output the optically modulated signal from the modulation unit 23 (Step S47), and terminates the processing operation illustrated in FIG. 13. If the temperature inside the optical modulator 20B has not converged to the second target temperature (Step S45: No), the optical transmission apparatus 1B returns to Step S45 to determine whether the temperature inside the optical modulator 20B has converged to the second target temperature.

The optical transmission apparatus 1B of the fifth embodiment, by supplying the drive current to the optical modulator heater 25 in accordance with activation of the power supply, is able to rapidly cause the temperature of the optical modulator 20B to converge to the second target temperature as compared to a case in which there is dependence on heat generation temperature of the LD 10. As a result, it is possible to largely reduce a start-up time of the optical transmission apparatus 1B.

Meanwhile, a case has been described in which the optical transmission apparatus 1B according to the fifth embodiment causes a large quantity of drive current to flow into the optical modulator heater 25 to heat the optical modulator 20B in accordance with activation of the power supply and supplies a stabilized bias current such that the output level of the optical signal of the LD 10 reaches the target level. However, it may be possible to gradually control the drive current supplied to the optical modulator heater 25 with an increase in the temperature of the optical modulator 20B while stably supplying the bias current to the LD 10.

Meanwhile, the optical modulator 20 (20A and 20B) of the first to the fifth embodiments is illustrated as a silicon photonics optical modulator. However, for example, a different optical modulator, such as a lithium niobate (LN) optical modulator, indium phosphide (InP) optical modulator, a polymer optical modulator, a directly modulated laser (DML) modulator, or an electro-absorption modulator laser (EML), is applicable.

Meanwhile, the InP optical modulator and the EML optical modulator are generally equipped with Peltier devices (thermoelectric coolers (TEC)) to control device temperature with high temperature characteristics. Therefore, because it is difficult to achieve the effects of the present invention in a case in which a TEC is included in components, so that it is necessary to determine whether temperature in a space in an optical modulator that does not include a TEC as a component has converged to the second target temperature, if needed. If a TEC component is isolated from the optical modulator, for example, it is possible to achieve the same effect even in the InP optical modulator and the EML optical modulator.

Furthermore, the invention described in the present application is applicable to an LN optical modulator and a DML optical modulator; however, the LN optical modulator and the DML modulator have small temperature variation, and it is possible to achieve a noticeable effect for a silicone photonics optical modulator with large temperature variation.

The present invention is applicable to an optical modulator with a hybrid configuration in which a waveguide is made of silicon and an MZM is made of a polymer or the like. Furthermore, while the optical transmission apparatus 1 is illustrated for convenience of explanation, the present invention is applicable to an optical communication apparatus in which an optical receiving device is incorporated in addition to the optical transmission apparatus 1.

The optical transmission apparatus 1 of the first embodiment may incorporate therein the optical modulator heater current setting unit 38 and the optical modulator heater 25 of the fifth embodiment. In this case, the optical transmission apparatus 1 is able to promptly cause the temperature of the optical modulator 20 to converge to the second target temperature by supplying a drive current to the optical modulator heater 25 in addition to performing ATC control on the LD 10 at the time of activation of the power supply. As a result, it is possible to largely reduce a start-up time from start of activation of a power supply to start of operation, as compared to the optical transmission apparatus 1 of the first embodiment.

While the example has been described in which the optical transmission apparatus 1 causes the temperature of the optical modulator 20 to converge to the second target temperature such that the temperature of the optical modulator 20 reaches the second target temperature, it may be possible to cause the temperature of the optical modulator 20 to reach the second target temperature or reach near the second target temperature.

The components of the units illustrated in the drawings need not necessarily be physically configured in the manner illustrated in the drawings. In other words, specific forms of distribution and integration of the components of each of the units are not limited to those illustrated in the drawings, and all or part of the units may be functionally or physically distributed or integrated in arbitrary units depending on various loads or use conditions.

Furthermore, all or an arbitrary part of various processing functions implemented by each of the apparatuses may be executed by a central processing unit (CPU) (or a microcomputer, such as a micro processing unit (MPU) or a micro controller unit (MCU)). Moreover, all or an arbitrary part of various processing functions may be executed by a program that is analyzed and executed by a CPU (or a microcomputer, such as an MPU or an MCU) or a hardware using wired logic.

According to one aspect, it is possible to reduce an activation time of an optical transmission apparatus.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission apparatus comprising:
    an emitter that emits an optical signal in accordance with a bias current; and
    a Mach-Zehnder optical modulator that optically modulates the optical signal in accordance with an electrical signal, wherein
    the optical modulator includes
        a detector that detects a temperature inside the optical modulator; and
        a controller that controls, when detecting activation of a power supply, the temperature inside the optical modulator such that the temperature detected by the detector reaches a target temperature.

2. The optical transmission apparatus according to claim 1, wherein when detecting activation of the power supply, the controller supplies, to the emitter, the bias current with a higher current value than a current value of the bias current that is supplied during operation such that the temperature detected by the detector reaches the target temperature.

3. The optical transmission apparatus according to claim 2, wherein
    the optical modulator includes
        a level detector that detects an output level of the optical signal that is input from the emitter to the optical modulator, and
    the controller performs a first current control method of supplying the bias current to the emitter such that the temperature detected by the detector reaches the target temperature, and thereafter, when the temperature of the optical modulator reaches the target temperature, the controller switches to a second current control method of supplying the bias current to the emitter such that the output level of the optical signal reaches a target level.

4. The optical transmission apparatus according to claim 2, wherein
    the optical modulator includes
        a level detector that detects an output level of the optical signal input from the emitter to the optical modulator, and
    the controller, when detecting activation of the power supply, performs a first current control method of supplying the bias current with an upper threshold of the emitter to the emitter for a predetermined time such that the temperature detected by the detector reaches the target temperature, and when the temperature inside the optical modulator reaches the target temperature, the controller switches to a second current control method of supplying the bias current to the emitter such that the output level of the optical signal reaches a target level.

5. The optical transmission apparatus according to claim 4, wherein the controller calculates the predetermined time for supplying the bias current with the upper threshold, by using a difference between a current temperature inside the optical modulator and the target temperature, a factor that imposes an influence of a disturbance on the optical modulator, a thermal resistance of the optical modulator, and a time constant information on the disturbance, and sets the predetermined time for the first current control method.

6. The optical transmission apparatus according to claim 2, further comprising:
    a shutter that turns off output of an optical signal from the optical modulator until an output level of the optical signal reaches a target level.

7. The optical transmission apparatus according to claim 1, wherein
    the emitter includes
        a first emitter that emits an optical signal with a first wavelength; and
        a second emitter that emits an optical signal with a second wavelength,
    the optical transmission apparatus further comprising:
        a first optical modulator that outputs a first optically modulated signal in accordance with an electrical signal, from the optical signal with the first wavelength from the first emitter;
        a second optical modulator that outputs a second optically modulated signal in accordance with an electrical signal, from the optical signal with the second wavelength from the second emitter; and
        a shutter that turns on and off output of the first optically modulated signal from the first optical modulator and output of the second optically modulated signal from the second optical modulator.

8. The optical transmission apparatus according to 1, wherein the optical modulator is a silicon photonics optical modulator.

9. The optical transmission apparatus according to claim 1, wherein
    the optical modulator includes
        a heater that applies heat to the optical modulator in accordance with a drive current, and
    the controller, when detecting activation of the power supply, supplies the drive current to the heater such that the temperature detected by the detector reaches the target temperature.

10. An optical modulator as a Mach-Zehnder optical modulator that optically modulates an optical signal in accordance with an electrical signal, the optical signal being emitted from an emitter in accordance with a bias current, the optical modulator comprising:
    a detector that detects a temperature inside the optical modulator; and
    a controller that, when detecting activation of a power supply, controls the temperature inside the optical modulator such that the temperature detected by the detector reaches a target temperature.

11. An activation method implemented by an optical transmission apparatus that includes an emitter that emits an optical signal in accordance with a bias current, and a Mach-Zehnder optical modulator that optically modulates the optical signal in accordance with an electrical signal, the activation method comprising:

detecting, by the optical modulator, a temperature inside the optical modulator; and controlling, by the optical modulator, when detecting activation of a power supply, the temperature inside the optical modulator such that the detected temperature reaches a target temperature.

* * * * *